(12) United States Patent
Mok et al.

(10) Patent No.: US 10,832,472 B2
(45) Date of Patent: Nov. 10, 2020

(54) METHOD AND/OR SYSTEM FOR RECONSTRUCTING FROM IMAGES A PERSONALIZED 3D HUMAN BODY MODEL AND THEREOF

(71) Applicant: The Hong Kong Polytechnic University, Kowloon (HK)

(72) Inventors: P. Y. Tracy Mok, Kowloon (HK); Shuaiyin Zhu, Kowloon (HK)

(73) Assignee: The Hong Kong Polytechnic University, Kowloon (HK)

(*) Notice: Subject to any disclaimer, the term of this patent is extended or adjusted under 35 U.S.C. 154(b) by 0 days.

(21) Appl. No.: 16/166,287

(22) Filed: Oct. 22, 2018

(65) Prior Publication Data
US 2020/0126295 A1  Apr. 23, 2020

(51) Int. Cl.
*G06K 9/62* (2006.01)
*G06T 17/20* (2006.01)
(Continued)

(52) U.S. Cl.
CPC .......... *G06T 17/20* (2013.01); *G06K 9/6202* (2013.01); *G06T 7/11* (2017.01); *G06T 7/50* (2017.01);
(Continued)

(58) Field of Classification Search
CPC .............. G06F 16/5838; G06K 9/00369; G06N 3/006; G06T 19/00; G06T 2210/16
See application file for complete search history.

(56) References Cited

U.S. PATENT DOCUMENTS 5,956,525 A  9/1999 Minsky
6,968,075 B1  11/2005 Chang
(Continued)

FOREIGN PATENT DOCUMENTS

CN  101564209 A  10/2009
CN  103535960 A  1/2014
(Continued)

OTHER PUBLICATIONS

Hao Kuang-rong, Lin Cun-rui, Ding Yong-sheng and Chen Bin, "Modification of Three-Dimensional Body Modeling Based on Figure Control," IEEE Computer Society, 2010 International Conference on Measuring Technology and Mechatronics (Year: 2010).*
(Continued)

*Primary Examiner* — Sing-Wai Wu
(74) *Attorney, Agent, or Firm* — Barlow, Josephs & Holmes, Ltd.

(57) ABSTRACT

A human body modelling method and apparatus and an electronic device. The method comprises: acquiring at least one human body image; extracting an original profile of a human body from the human body image; calculating a body surface profile of the human body according to the original profile; and constructing a three dimensional human body model according to the body surface profile. The establishment of a three dimensional human body model originates from two dimensional human body images, without using a human body scanner to scan a human body, which reduces the cost of establishing the three dimensional human body model. Moreover, there is no requirement for the position and dressing of a human body object, and the process of establishing the three dimensional human body model is more convenient.

18 Claims, 11 Drawing Sheets

(51) Int. Cl.
  *G06T 19/20* (2011.01)
  *G06T 7/11* (2017.01)
  *G06T 7/50* (2017.01)
  *G06T 7/70* (2017.01)
  G06T 7/194 (2017.01)

(52) U.S. Cl.
  CPC ............... *G06T 7/70* (2017.01); *G06T 19/20* (2013.01); *G06T 7/194* (2017.01); *G06T 2200/08* (2013.01); *G06T 2200/24* (2013.01); *G06T 2207/30196* (2013.01); *G06T 2207/30204* (2013.01); *G06T 2215/16* (2013.01); *G06T 2219/2004* (2013.01); *G06T 2219/2016* (2013.01); *G06T 2219/2021* (2013.01)

(56) References Cited

U.S. PATENT DOCUMENTS

| | | | |
|---|---|---|---|
| 7,242,999 | B2 | 7/2007 | Wang |
| 8,139,067 | B2 | 3/2012 | Anguelov et al. |
| 8,321,301 | B2 | 11/2012 | Manea et al. |
| 8,520,932 | B2 | 8/2013 | Cool et al. |
| 8,655,053 | B1 | 2/2014 | Hansen |
| 8,699,787 | B2 | 4/2014 | van den Hengel et al. |
| 8,813,378 | B2 | 8/2014 | Grove |
| 8,842,906 | B2 | 9/2014 | Watson et al. |
| 2009/0138468 | A1 | 5/2009 | Kurihara |
| 2012/0086783 | A1 | 4/2012 | Sareen |
| 2013/0108121 | A1 | 5/2013 | de Jong |
| 2013/0287294 | A1 | 10/2013 | Ye et al. |
| 2016/0088284 | A1* | 3/2016 | Sareen ............... G06N 3/006 348/47 |
| 2017/0053422 | A1* | 2/2017 | Chojnowski ............. G06T 7/62 |

FOREIGN PATENT DOCUMENTS

| | | |
|---|---|---|
| CN | 103767219 A | 5/2014 |
| CN | 104346827 A | 2/2015 |
| CN | 104508704 A | 4/2015 |

OTHER PUBLICATIONS

Shuaiyin Zhu, P.Y. Mok and Y.L. Kwok, "An efficient human model customization method based on orthogonal-view monocular photos," Computer-Aided Design 45 (2013) 1314-1332 (Year: 2013).*

Shuaiyin Zhu, P.Y. Mok, "Predicting realistic and precise human body models under clothing based on orthogonal-view photos", Procedia Manufacturing 3 (2015) 3812-3819 (6th International Conference on Applied Human Factors and Ergonomics (AHFE 2015) and the Affiliated Conferences, AHFE 2015) (Year: 2015).*

Edilson de Aguiar, Leandro Lesqueves Costalonga, Luis Otavio Rigo Junior and Rodolfo de Silva Villaca, "Capture and Stylization of Human Models," 2013 XXVI IEEE Conference on Graphics, Pattern and Images, p. 282-287 (Year: 2013).*

\* cited by examiner

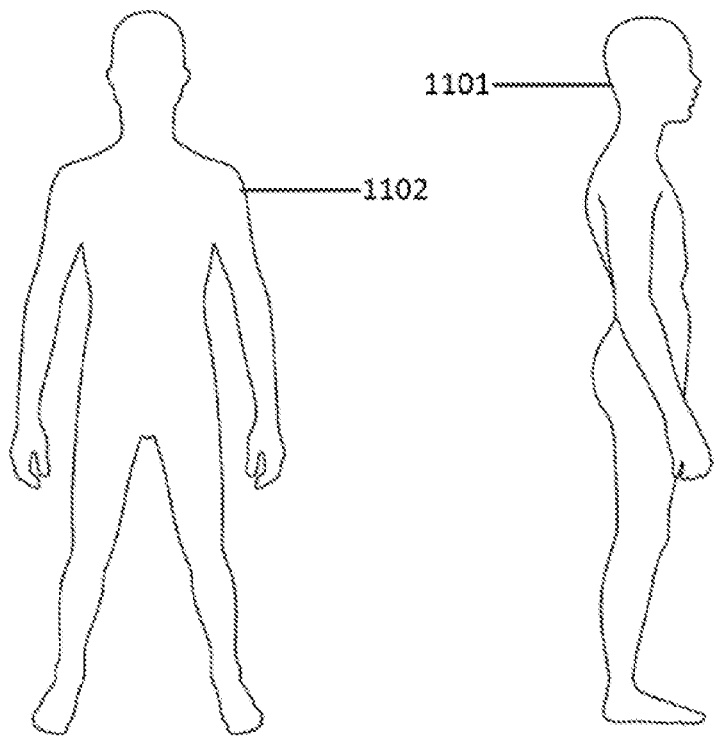
*Fig. 11 (a)*          *Fig. 11 (b)*
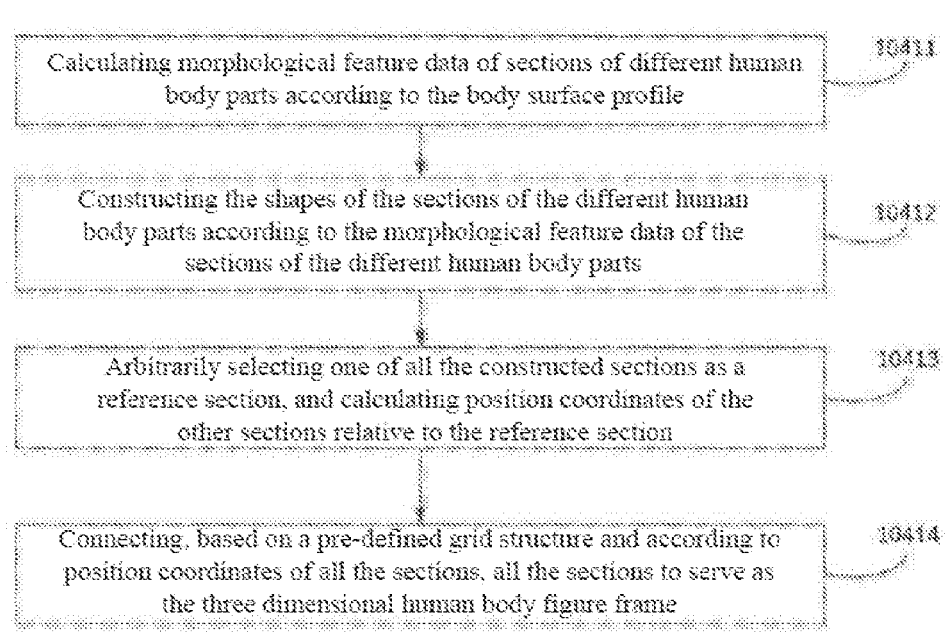
*Fig. 12*

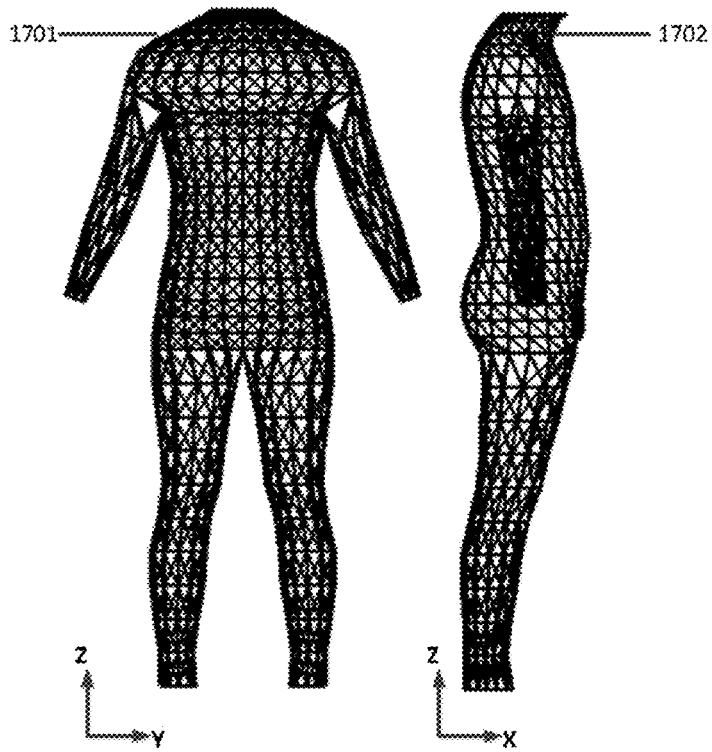
*Fig. 17 (a)*     *Fig. 17 (b)*
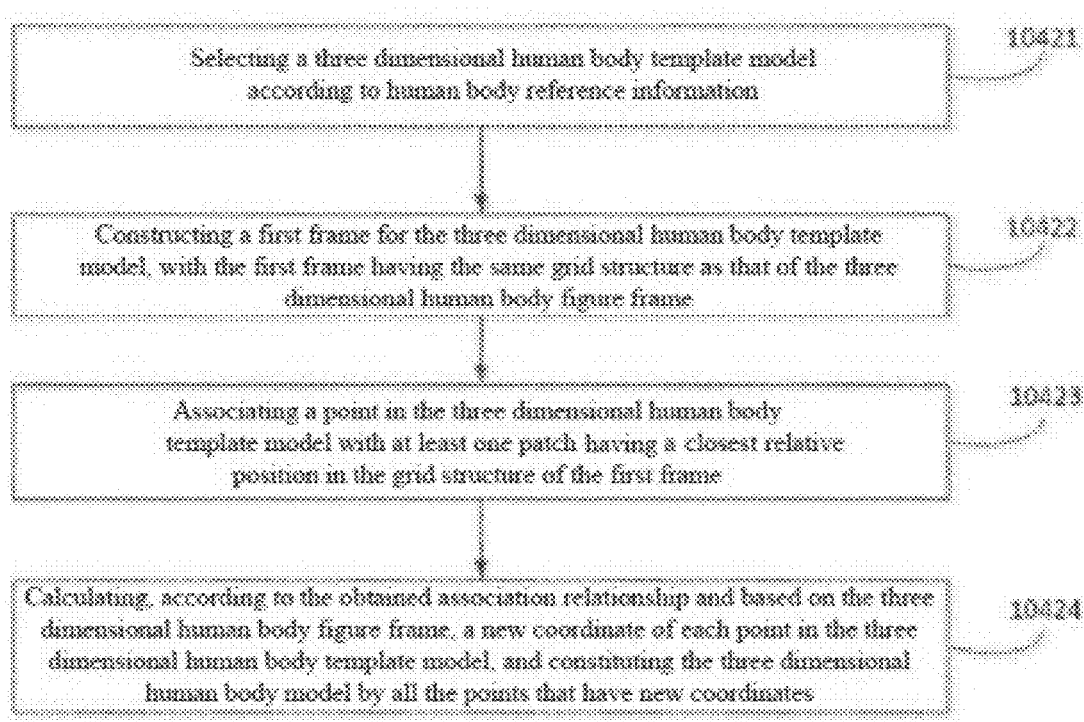
*Fig. 18*

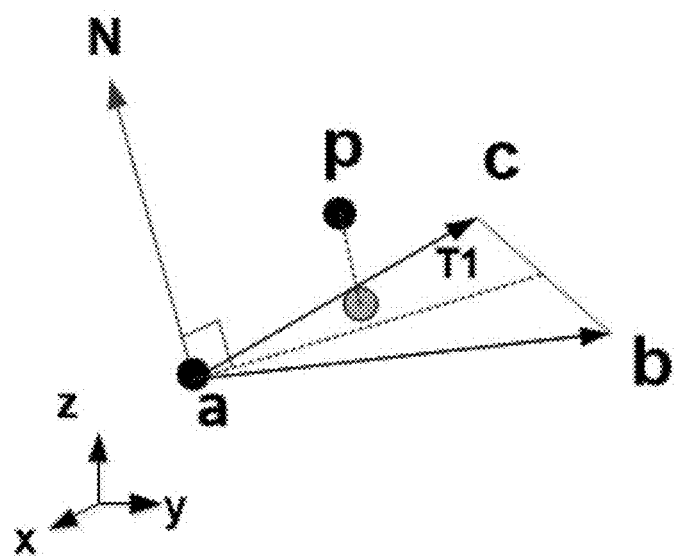
*Fig. 19*
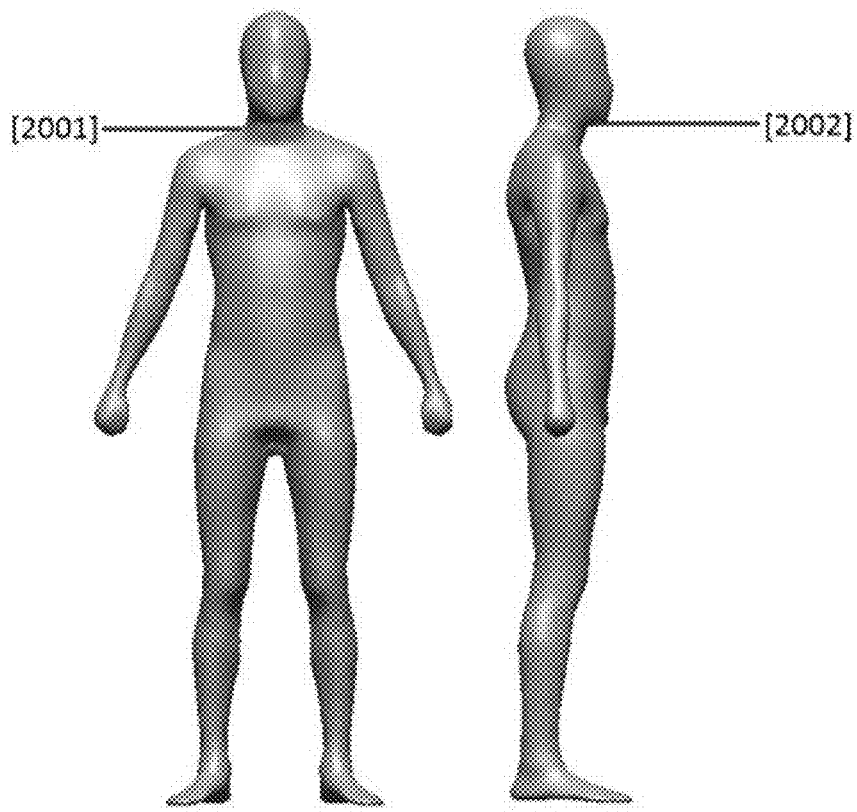
*Fig. 20 (a)*     *Fig. 20 (b)*

METHOD AND/OR SYSTEM FOR RECONSTRUCTING FROM IMAGES A PERSONALIZED 3D HUMAN BODY MODEL AND THEREOF

TECHNICAL FIELD

The present invention relates to a human body modelling method on an electronic device.

BACKGROUND ART

Nowadays, in many research applications, three dimensional human body modelling has always been an important research topic in the field of computer graphics and computer vision. Three dimensional human body modelling is a component of computer human body simulation, and even to this day, researchers still continuously study computer human body modelling technologies. With the continuous development of computer technologies, three dimensional human body modelling now has been very widely applied in the fields of scientific researches, animations, computer games, costume designing, industry and so on. Consequently, how to perform three dimensional modelling on a human body is a technical focal point to which people pay attention. The existing three dimensional modelling technologies scan a human body object mainly by means of a human body scanner, so as to obtain a three dimensional human body model. The scanned human body object is required not to wear clothes or wear few underclothes, and is required to stay at a special position so as to be scanned by the human body scanner.

During the study and implementation processes of relevant technologies, the inventors find that there are at least the following problems in the prior art mentioned above: due to the relatively high expense of the human body scanner, the cost spent in establishing the three dimensional human body model is relatively high. Additionally, since there is a special requirement for the position of the scanned human body object, and the scanned human body object is required not to wear clothes or wear few underclothes, there are many limitations on the process of establishing the three dimensional human body model, and thus it is not convenient enough and the expense is relatively large during the establishment of the three dimensional human body model.

SUMMARY OF THE INVENTION

To solve the above-mentioned problems in the prior art, the embodiments of the present invention provide a human body modelling method and apparatus and an electronic device.

The human body modelling method provided using at least one or more electronic devices according to the present invention comprises:

acquiring by an image acquisition means of the at least one or more electronic devices at least one human body image;

extracting using a processor of the at least one or more electronic devices an original profile of a human body from the human body image;

calculating using a processor of the at least one or more electronic devices a body surface profile of the human body according to the original profile;

and constructing using a processor of the at least one or more electronic devices a three dimensional human body model according to the body surface profile.

In the above-mentioned human body modelling method provided using at least one or more electronic devices according to the present invention, said acquiring at least one human body image comprises acquiring by the image acquisition means a frontal human body image and a side human body image.

In the above-mentioned human body modelling method provided using at least one or more electronic devices according to the present invention, wherein after constructing a three dimensional human body model using a processor of the at least one or more electronic devices according to the body surface profile, the method further comprises:

determining geometric positions of key points or key features on the three dimensional human body model using a processor of the at least one or more electronic devices; and calculating using a processor of the at least one or more electronic devices the measurement data of the three dimensional human body model according to the geometric positions of the key points or the key features.

In the above-mentioned human body modelling method provided using at least one or more electronic devices according to the present invention, wherein after calculating measurement data of the three dimensional human body model, the method further comprises:

converting using a processor of the at least one or more electronic devices the measurement data according to a human body size standard.

In the above-mentioned human body modelling method provided using at least one or more electronic devices according to the present invention, wherein extracting an original profile from the human body image comprises:

taking, when a user operation is detected on the human body image displayed on the electronic device, a point or a line or a plane, at which the position for the operation is located, as a part of the original profile.

In the above-mentioned human body modelling method provided using at least one or more electronic devices electronic device according to the present invention, extracting an original profile from the human body image comprises:

extracting, in combination with an image segmentation algorithm, the original profile from the human body image when a foreground and a background selected by a user are detected on the human body image.

In the above-mentioned human body modelling method provided using at least one or more electronic devices according to the present invention, extracting an original profile from the human body image comprises:

selecting a first human-like template and a second human-like template, with the size of the first human-like template being less than that of the second human-like template;

calculating using a processor, a region between the second human-like template and the first human-like template to serve as a possible region where the original profile is located; and extracting the original profile from the possible region by using image segmentation.

In the above-mentioned human body modelling method provided using at least one or more electronic devices according to the present invention, before calculating a region where the second human-like template is larger than the first human-like template, the method further comprises:

identifying using a processor a reference mark feature in the human body image; and adjusting the first human-like template and the second human-like template based on the position of the reference mark feature.

In the above-mentioned human body modelling method provided using at least one or more electronic devices according to the present invention, the method for adjusting the human-like templates comprises:

calculating a pixel distance between the face and feet in the human body image; and scaling the first human-like template and the second human-like template based on the pixel distance.

In the above-mentioned human body modelling method provided using at least one or more electronic devices according to the present invention, the method for adjusting the human-like templates further comprises:

calculating an angle between an arm and the body in the human body image, and correspondingly adjusting the positions of arms in the first human-like template and the second human-like template; and calculating an angle between legs in the human body image, and correspondingly adjusting the positions of legs in the first human-like template and the second human-like template.

In the above-mentioned human body modelling method provided using at least one or more electronic devices according to the present invention, calculating a body surface profile of the human body according to the original profile comprises:

determining a body boundary mark feature of the original profile according to a shape feature of the original profile;

selecting one or more body profiles from a body profile library according to a shape feature of the body boundary mark feature; and interpolating the selected one or more body profiles to obtain the body surface profile of the human body.

In the above-mentioned human body modelling method provided using at least one or more electronic devices according to the present invention, determining a body boundary mark feature of the original profile comprises:

calculating a shape feature of a point or a region on the original profile to serve as a first shape feature;

determining whether the first shape feature satisfies a pre-set condition; and determining, if the pre-set condition is satisfied, that the point or the region on the original profile serves as the body boundary mark feature.

In the above-mentioned human body modelling method provided using at least one or more electronic devices according to the present invention, feature comprises at least one of:

a relative coordinate distance between the point or the region on the profile and a reference point;

the curvature of the point or the region on the profile;

or a distance between the point or the region on the profile and its corresponding point or region.

In the above-mentioned human body modelling method provided using at least one or more electronic devices according to the present invention, determining whether the first shape feature satisfies the pre-set condition comprises:

selecting using a processor one or more reference profiles similar to the original profile according to a human body parameter;

calculating using a processor a shape feature of a point or a region on the reference profile corresponding to that on the original profile to serve as a second shape feature; and determining that the point or the region on the original profile serves as the body boundary mark feature if a difference value between the first shape feature and the second shape feature is less than a pre-set threshold value.

In the above-mentioned human body modelling method provided using at least one or more electronic devices according to the present invention, the human body parameter comprises at least one of:

the area enclosed by the original profile, the height of the human body or the weight of the human body.

In the above-mentioned human body modelling method provided using at least one or more electronic devices according to the present invention, said selecting one or more body profiles from the body profile library according to the shape feature of the body boundary mark feature comprises:

calculating a shape feature of a point or a region, on a body profile in the body profile library, corresponding to the body boundary mark feature to serve as a third shape feature;

calculating a difference value between the third shape feature and the shape feature of the body boundary mark feature; and selecting one or more body profiles with the smallest difference value.

In the above-mentioned human body modelling method provided using at least one or more electronic devices according to the present invention, constructing a three dimensional human body model according to the body surface profile comprises:

constructing a three dimensional human body figure frame according to the body surface profile; and constructing the three dimensional human body model based on the three dimensional human body figure frame using a processor.

In the above-mentioned human body modelling method provided using at least one or more electronic devices according to the present invention, constructing a three dimensional human body figure frame according to the body surface profile comprises:

calculating using a processor, a plurality of morphological feature data of sections of different human body parts according to the body surface profile;

constructing the shapes of the sections of the different human body parts according to the morphological feature data of the sections of the different human body parts using a processor;

arbitrarily selecting one of all the constructed sections as a reference section, and calculating position coordinates of the other sections relative to the reference section; and connecting, based on a pre-defined grid structure and according to position coordinates of all the sections, all the sections to serve as the three dimensional human body figure frame.

In the above-mentioned human body modelling method provided using at least one or more electronic devices according to the present invention, constructing a three dimensional human body model based on the three dimensional human body figure frame comprises:

selecting a three dimensional human body template model according to human body reference information;

constructing a first frame for the three dimensional human body template model, with the first frame having the same grid structure as the three dimensional human body figure frame;

associating a point in the three dimensional human body template model with at least one patch having a closest relative position in the grid structure of the first frame; and calculating using a processor, according to the obtained association relationship and based on the three dimensional human body figure frame, a new coordinate of each point in the three dimensional human body template model, and constituting the three dimensional human body model by all the points that have new coordinates.

The embodiment of the human body modelling apparatus provided according to another aspect of the present invention comprises:

an acquisition module for acquiring at least one human body image;

an extraction module configured to use a processor for extracting an original profile of a human body from the human body image;

a calculation module configured to use a processor for calculating a body surface profile of the human body according to the original profile; and a construction module configured to use a processor for constructing a three dimensional human body model according to the body surface profile.

In the above-mentioned embodiment of the human body modelling apparatus provided in the present invention, the acquisition module comprises means for acquiring a frontal human body image and a side human body image.

In the above-mentioned embodiment of the human body modelling apparatus provided in the present invention, the construction module further comprises:

means for determining geometric positions of key points or key features on the three dimensional human body model; and means for calculating measurement data of the three dimensional human body model according to the geometric positions of the key points or the key features.

In the above-mentioned embodiment of the human body modelling apparatus provided in the present invention, the means for calculating measurement data of the three dimensional human body model further comprises: means for converting the measurement data according to a human body size standard.

In the above-mentioned embodiment of the human body modelling apparatus provided in the present invention, the extraction module comprises: means for taking, when a user operation is detected on the human body image, a point or a line or a plane, at which the position for the operation is located, as a part of the original profile.

In the above-mentioned embodiment of the human body modelling apparatus provided in the present invention, the extraction module comprises: means for extracting, in combination with an image segmentation algorithm, the original profile from the human body image when a foreground and a background selected by a user are detected on the human body image.

In the above-mentioned embodiment of the human body modelling apparatus provided in the present invention, the extraction module comprises:

means for selecting a first human-like template and a second human-like template, with the size of the first human-like template being less than that of the second human-like template;

means for calculating a region between the second human-like template and the first human-like template to serve as a possible region where the original profile is located; and means for extracting the original profile from the possible region by using an image segmentation algorithm.

In the above-mentioned embodiment of the human body modelling apparatus provided in the present invention, the extraction module further comprises:

means for identifying a reference mark feature in the human body image; and means for adjusting the first human-like template and the second human-like template based on the position of the reference mark feature.

In the above-mentioned embodiment of the human body modelling apparatus provided in the present invention, the means for adjusting the first human-like template and the second human-like template based on the position of the reference mark feature comprises:

means for calculating a pixel distance between the face and feet in the human body image; and means for scaling the first human-like template and the second human-like template based on the pixel distance.

In the above-mentioned embodiment of the human body modelling apparatus provided in the present invention, the means for adjusting the first human-like template and the second human-like template based on the position of the reference mark feature further comprises:

means for calculating an angle between an arm and the body in the human body image, and correspondingly adjusting the positions of arms in the first human-like template and the second human-like template; and means for calculating an angle between legs in the human body image, and correspondingly adjusting the positions of legs in the first human-like template and the second human-like template.

In the above-mentioned embodiment of the human body modelling apparatus provided in the present invention, the calculation module comprises:

means for determining a body boundary mark feature of the original profile according to a shape feature of the original profile;

means for selecting one or more body profiles from a body profile library according to a shape feature of the body boundary mark feature; and means for interpolating the selected one or more body profiles to obtain the body surface profile of the human body.

In the above-mentioned embodiment of the human body modelling apparatus provided in the present invention, the means for determining a body boundary mark feature of the original profile according to a shape feature of the original profile comprises:

means for calculating a shape feature of a point or a region on the original profile to serve as a first shape feature;

means for determining whether the first shape feature satisfies a pre-set condition; and means for determining, if the pre-set condition is satisfied, that the point or the region on the original profile serves as the body boundary mark feature.

In the above-mentioned embodiment of the human body modelling apparatus provided in the present invention, the shape feature comprises at least one of:

a relative coordinate distance between the point or the region on the profile and a reference point;

the curvature of the point or the region on the profile;

or a distance between the point or the region on the profile and its corresponding point or region.

In the above-mentioned embodiment of the human body modelling apparatus provided in the present invention, the means for determining whether the first shape feature satisfies a pre-set condition comprises:

means for selecting one or more reference profiles similar to the original profile according to a human body parameter;

means for calculating a shape feature of a point or a region on the reference profile corresponding to that on the original profile to serve as a second shape feature; and means for determining that the point or the region on the original profile serves as the body boundary mark feature if a difference value between the first shape feature and the second shape feature is less than a pre-set threshold value.

In the above-mentioned embodiment of the human body modelling apparatus provided in the present invention, the human body parameter comprises at least one of:

the area enclosed by the original profile, the height of the human body or the weight of the human body.

In the above-mentioned embodiment of the human body modelling apparatus provided in the present invention, the means for selecting one or more body profiles from a body profile library according to a shape feature of the body boundary mark feature comprises:

means for calculating a shape feature of a point or a region, on a body profile in the body profile library, corresponding to the body boundary mark feature to serve as a third shape feature;

means for calculating a difference value between the third shape feature and the shape feature of the body boundary mark feature; and means for selecting one or more body profiles with the smallest difference value.

In the above-mentioned embodiment of the human body modelling apparatus provided in the present invention, the construction module comprises:

means for constructing a three dimensional human body figure frame according to the body surface profile; and means for constructing the three dimensional human body model based on the three dimensional human body figure frame.

In the above-mentioned embodiment of the human body modelling apparatus provided by the present invention, the means for constructing the three dimensional human body figure frame according to the body surface profile comprises:

means for calculating morphological feature data of sections of different human body parts according to the body surface profile;

means for constructing the shapes of the sections of the different human body parts according to the morphological feature data of the sections of the different human body parts;

means for arbitrarily selecting one of all the constructed sections as a reference section, and calculating position coordinates of the other sections relative to the reference section; and means for connecting, based on a pre-defined grid structure and according to position coordinates of all the sections, all the sections to serve as the three dimensional human body figure frame.

In the above-mentioned embodiment of the human body modelling apparatus provided in the present invention, the means for constructing a three dimensional human body model based on the three dimensional human body figure frame comprises:

means for selecting a three dimensional human body template model according to human body reference information;

means for constructing a first frame for the three dimensional human body template model, with the first frame having the same grid structure as the three dimensional human body figure frame;

means for associating a point in the three dimensional human body template model with at least one patch having a closest relative position in the grid structure of the first frame; and means for calculating, according to the obtained association relationship and based on the three dimensional human body figure frame, a new coordinate of each point in the three dimensional human body template model, and constituting the three dimensional human body model by all the points that have new coordinates.

According to another aspect of the present invention, an embodiment of an electronic device for modelling a human body is provided, and the electronic device comprising:

a processing component;

a memory for storing instructions executable by the processing component; and a multi-media component, wherein the multi-media component is configured to provide a an interface for receiving user interaction; and the processing component is configured acquire at least one human body image; extract an original profile of a human body from the human body image; calculate a body surface profile of the human body according to the original profile; and construct and display a three dimensional human body model according to the body surface profile.

According to another aspect of the present invention, an embodiment of an electronic device is provided, and the electronic device comprising:

a processing component;

a memory for storing instructions executable by the processing component; and a camera component; a multi-media component, wherein the camera component is configured to acquire at least one human body image;

the multi-media component is configured to provide a user interaction interface; and the processing component is configured to perform at least one of the following operations: reading the at least one human body image; extracting features of the human body image, wherein the features at least comprise a body boundary mark feature and a reference mark feature; determining, according to the extracted features, a two dimensional human body profile when clothes are not worn; constructing a three dimensional human body figure frame according to the two dimensional human body profile; and constructing the three dimensional human body model based on the three dimensional human body figure frame.

In the above-mentioned embodiment of the electronic device of the present invention, the electronic device further comprises a communication component; and the communication component is configured to: provide a bidirectional communication link between the electronic device and a server; transmit data which is sent by the electronic device to the server; and receive data which is sent by the server to the electronic device.

In the above-mentioned embodiment of the electronic device of the present invention, the sending data comprises at least one of:

the at least one human body image, the original profile of the human body in the human body image, the body surface profile of the human body, the three dimensional human body model, or information about the human body in the human body image.

In the above-mentioned embodiment of the electronic device of the present invention, the receiving data comprises at least one of:

the at least one human body image, the original profile of the human body in the human body image, the body surface profile of the human body, the three dimensional human body model, or information about the human body in the human body image.

The beneficial effects brought about by implementing the technical solutions provided in various embodiments of the present invention regarding to the human body modelling method and apparatus and the electronic device are: acquiring at least one human body image, extracting features of the human body image, determining, according to the extracted features, a two dimensional human body profile when clothes are not worn, constructing a three dimensional human body figure frame according to the two dimensional human body profile, and constructing a three dimensional human body model based on the three dimensional human body figure frame. Since the establishment of the three dimensional human body model in the present invention originates from a two dimensional human body image, without using a human body scanner to scan a human body, the cost expense of establishing the three dimensional human body model is reduced. Moreover, since there is no requirement for the position of a human body object and for the dressing of the human body object when a human body image is acquired, the operation threshold for establishing a three dimensional human body model is lowered, and the process of establishing the three dimensional human body model is more convenient.

BRIEF DESCRIPTION OF THE DRAWING FIGURES

FIG. 1 is a flowchart of a human body modelling method as shown according to an exemplary embodiment of the present invention;

FIGS. 2(a) and (b) are respectively exemplary diagrams of frontal and sidehuman body images acquired in an exemplary embodiment of the present invention;

FIGS. 3(a) and (b) are respectively schematic diagrams of extracting an original profile of a human body from a human body image in an exemplary embodiment of the present invention;

FIG. 4 is a schematic flowchart of a method for automatically extracting an original profile of a human body as shown according to an exemplary embodiment of the present invention;

FIGS. 5(a) and (b) are respectively schematic diagrams of identifying a reference mark feature from front view and side view human body images in an exemplary embodiment of the present invention;

Figure 8:
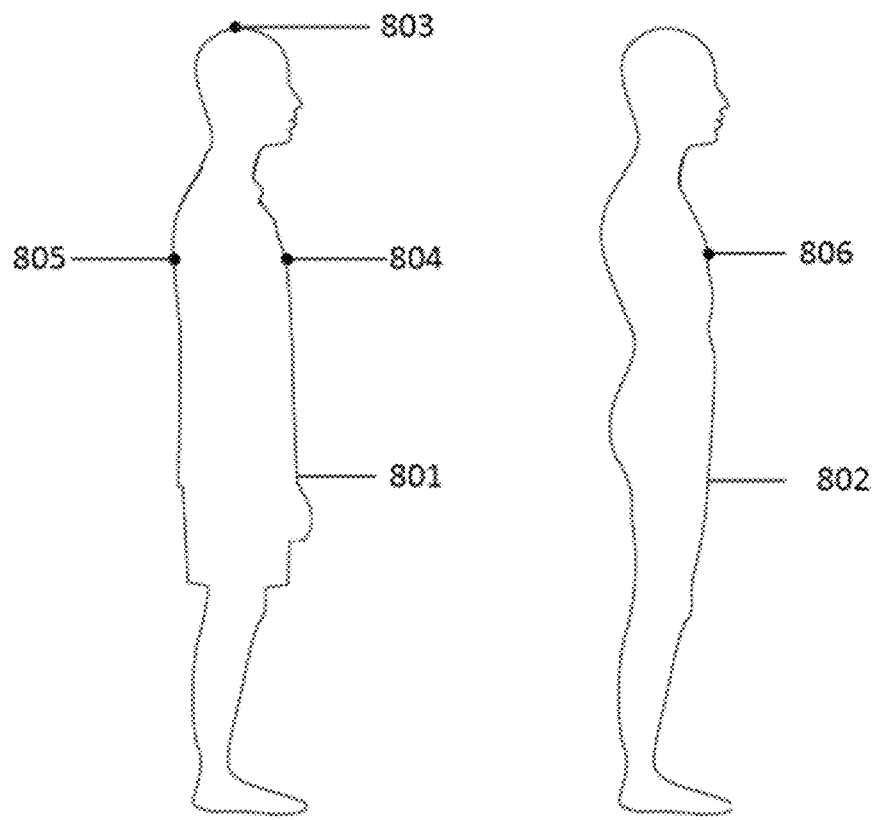
Figure 9:
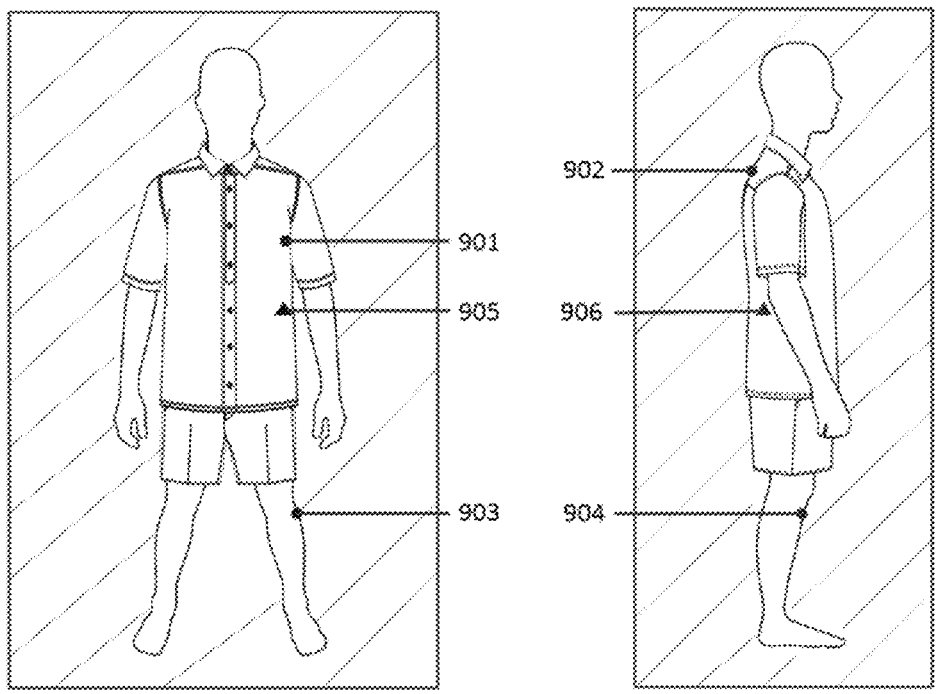
Figure 10:
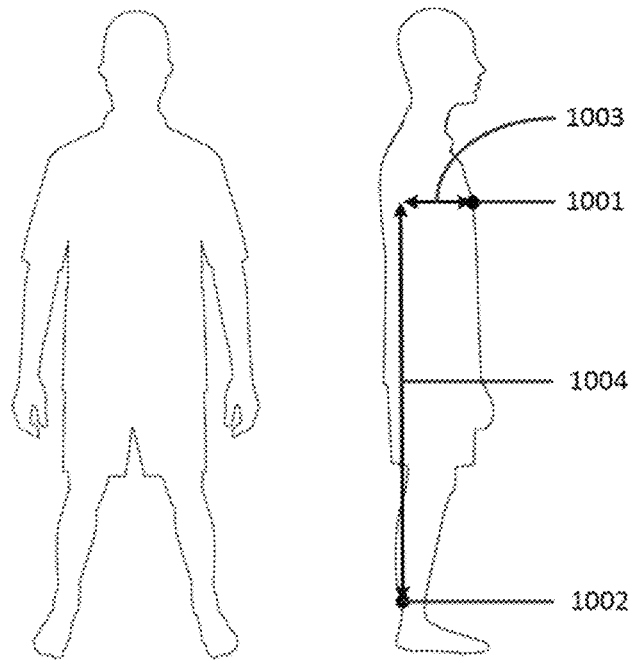
Figure 13:
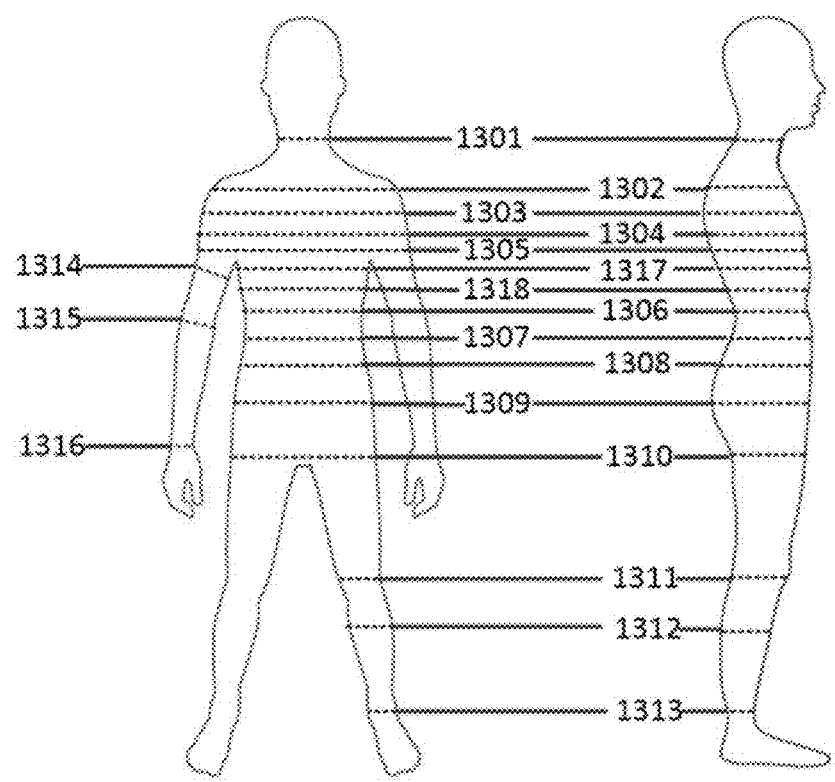
Figure 14:
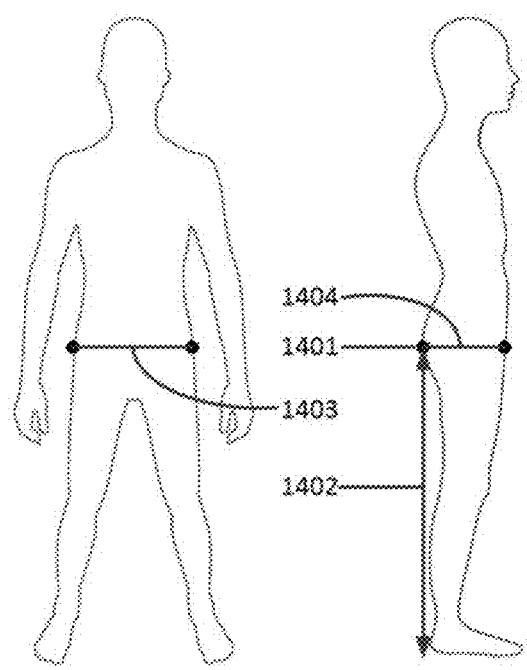
Figure 15:
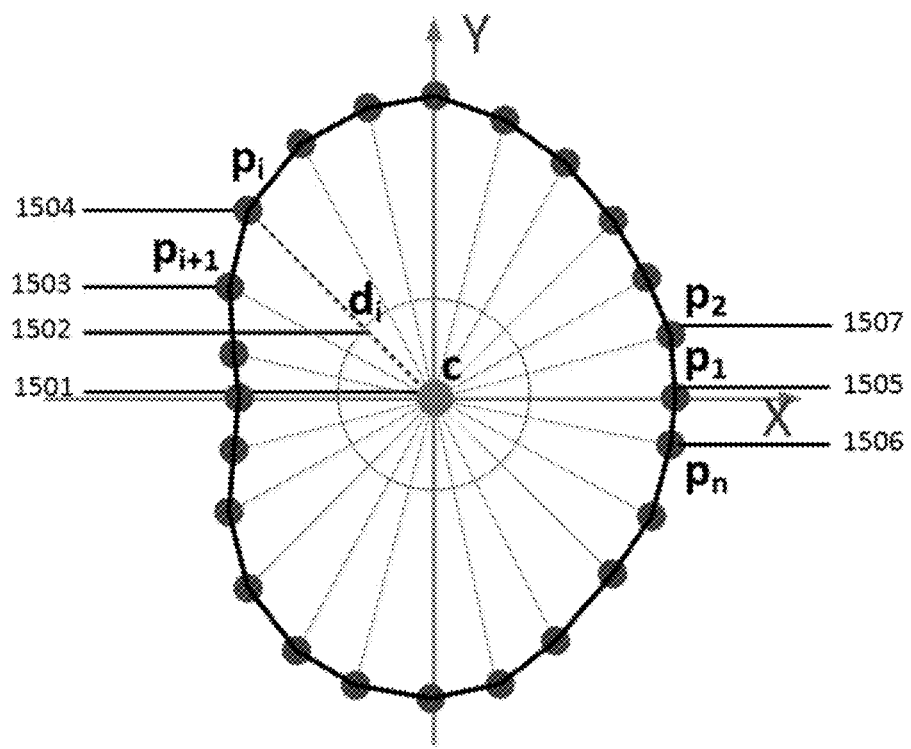
Figure 16:
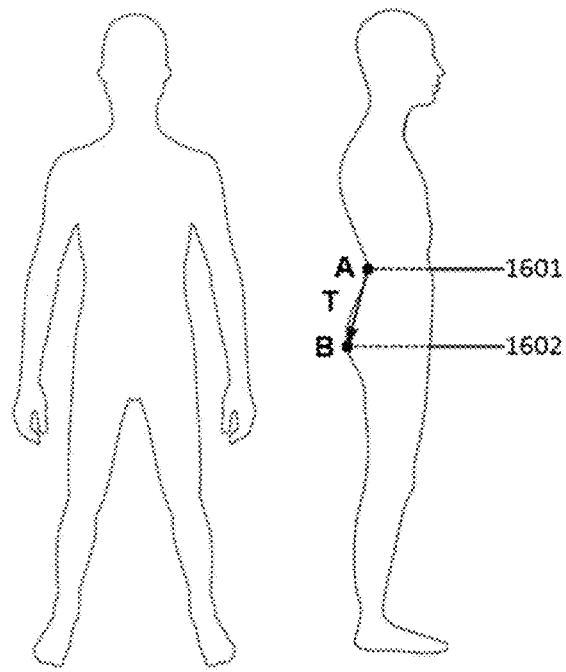
Figure 21:
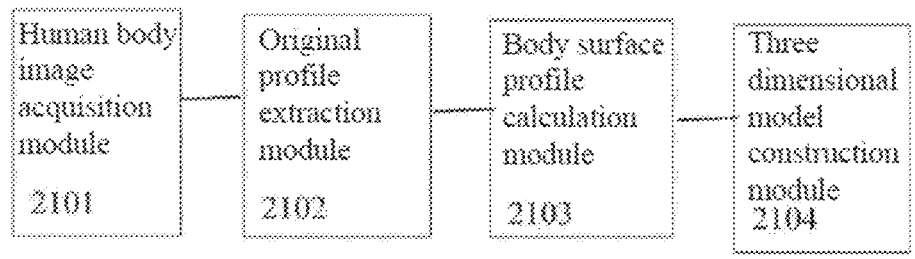
Figure 22:
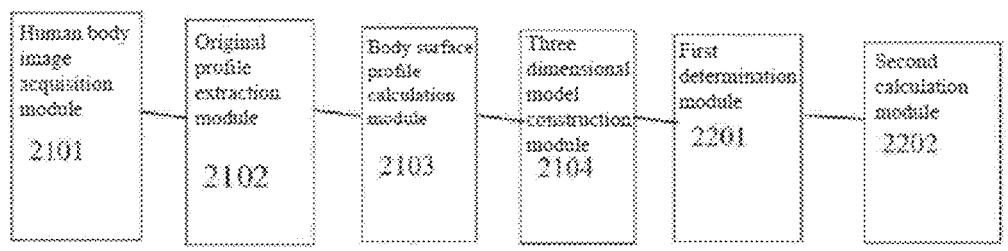
Figure 23:
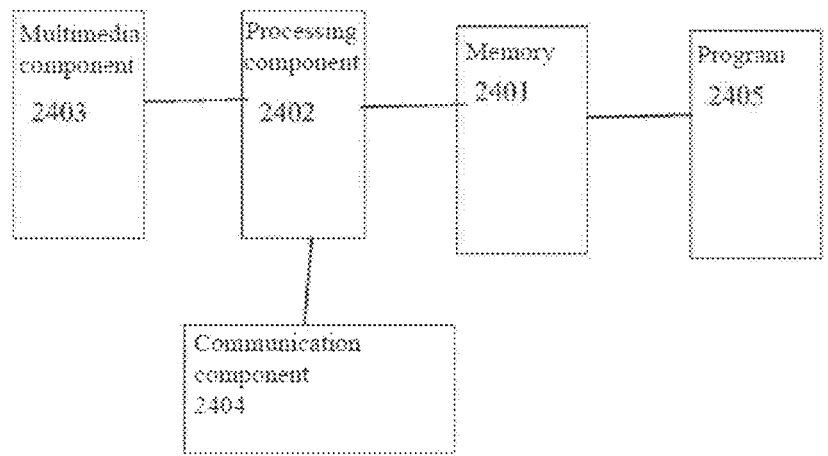

FIGS. 8(a) and (b) are respectively exemplary diagrams for illustrating a relationship between an original profile and a body shape or a body boundary feature in an exemplary embodiment of the present invention;

FIG. 9 is a schematic diagram for illustrating user operations for determining a body boundary mark feature in an exemplary embodiment;

FIG. 10 is a schematic diagram for illustrating the calculation of a shape feature using a body boundary feature in a side view in an exemplary embodiment;

FIGS. 11(a) and (b) are respectively schematic diagrams for illustrating the obtaining of a body surface profile based on a front view human body image and a side view human body image in an exemplary embodiment;

FIG. 12 is a schematic flowchart for illustrating the construction of a three dimensional human body figure frame in an exemplary embodiment of the present invention;

FIG. 13 is a schematic diagram for illustrating a section with features in a side view body surface profile in an exemplary embodiment;

FIG. 14 is a schematic diagram for illustrating the calculation of a corresponding height of a hip section according to a side view body surface profile of a human body in an exemplary embodiment;

FIG. 15 is a schematic diagram for illustrating the calculating and obtaining, of a shape parameter for a waist section based on morphological data of the section and a relationship model of the section in an exemplary embodiment;

FIG. 16 is a schematic diagram for illustrating the calculation of position coordinates according to a section in a schematic embodiment;

FIGS. 17(a) and (b) are respectively a front view and a side view of a three dimensional human body figure frame in a schematic embodiment;

FIG. 18 is a schematic flowchart of a method for constructing a three dimensional human body model in a schematic embodiment of the present invention;

FIG. 19 is a schematic diagram of representing a point in a three dimensional human body template model with vectors in a schematic embodiment;

FIG. 20 is a schematic diagram of a three dimensional human body model acquired based on the above-mentioned human body modelling method in a schematic embodiment, in which 2001 in FIG. 20 (a) is a front view of the three dimensional human body model, and 2002 in FIG. 20 (b) is a side view of the three dimensional human body model;

FIG. 21 is a schematic logic block diagram of an exemplary embodiment of a human body modelling apparatus of the present invention;

FIG. 22 is a schematic logic block diagram of another exemplary embodiment of a human body modelling apparatus of the present invention; and FIG. 23 is a schematic logic block diagram of an exemplary embodiment of an electronic device of the present invention.

DETAILED DESCRIPTION OF EXEMPLARY EMBODIMENTS

In order to make the objectives, technical solutions, and advantages of the present invention clearer, the embodiments of the present invention will be further described in detail below in conjunction with the accompanying drawings. The embodiments are all illustrative but not restrictive.

Figure 1:
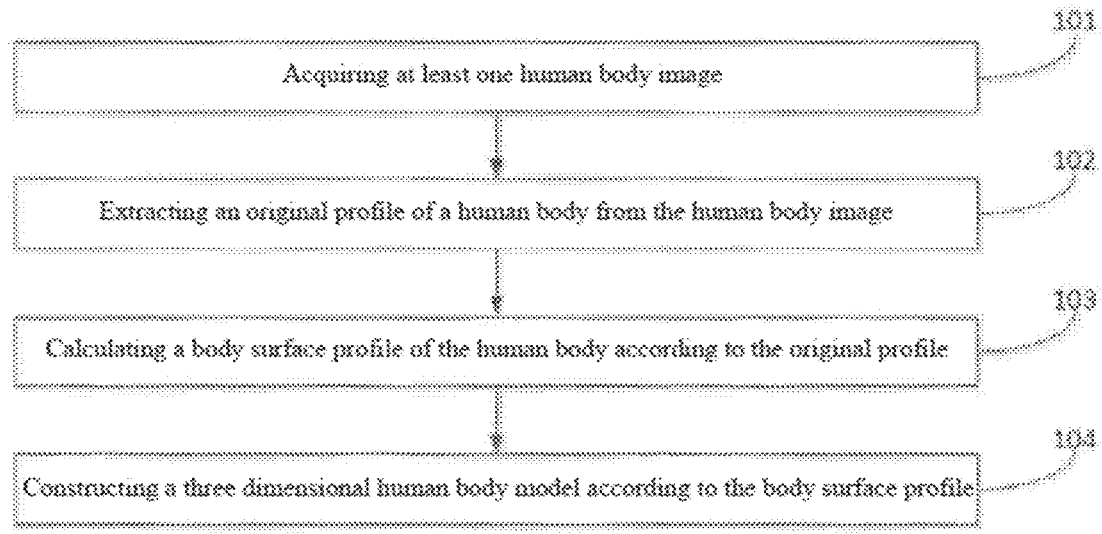

FIG. 1 is a flowchart of a human body modelling method as shown according to an exemplary embodiment of the present invention. As shown in FIG. 1, the flow of the human body modelling method comprises the steps of:

step 101, acquiring at least one human body image;

step 102, extracting an original profile of a human body from the human body image;

step 103, calculating a body surface profile of the human body according to the original profile; and step 104, constructing a three dimensional human body model according to the body surface profile.

When a human body image is acquired in step 101, the acquired human body image(s) can be one or more photos obtained by a photographing device taking a photo of a human body object. The photographing device can be a digital camera, any mobile devices, a computer with a built-in camera, etc., and in this embodiment, the type of the photographing device is not limited specifically.

In step 101, the acquisition of at least one human body image comprises acquiring one or more human body images at any photographing angle. For example, the human body image can be a frontal human body image or a side human body image, or two human body images that are 90 degrees apart from each other in photographing angle, three human body images that are 120 degrees apart from one another in photographing angle, four human body images that are 90 degrees apart from one another in photographing angle, or other numbers of human body images that are apart from one another in uniformly-spaced photographing angle and the like. In this embodiment, the photographing angle and the number of the acquired human body images are not limited specifically.

Figures 2A, 2B:
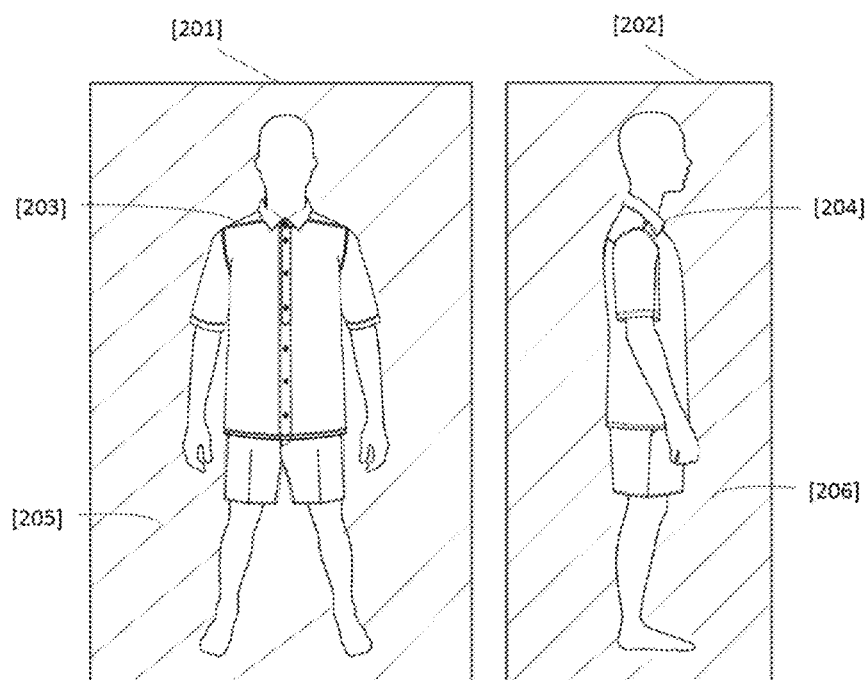

As shown in FIG. 2, in order to ensure the accuracy of human body modelling, and also to use human body images as few as possible so as to reduce the requirement for computation resources, when a human body image is acquired in step 101 of FIG. 1, at least one front view human body image 201 as shown in FIG. 2(a) and one side view human body image 202 as shown in FIG. 2(b) can be acquired. The parts with slashes in the figures respectively represent backgrounds 205 and 206 of the human body images. The parts other than the parts with slashes are respectively a frontal human body portion 203 and a side human body portion 204. One of the advantages of the present invention is that a complex image background is acceptable, that is, there is no strict requirement for the photographing place of the human body image, and the photographing place can be indoors, a shopping mall or other outdoor environments. However, in order to improve the accuracy of human body modelling, the background of the human body image can be a pure colour and has a strong contrast with the colour of clothes worn on the human body and the skin colour of the human body. Another advantage of the present invention is to allow a human in the human body image to wear relative looser clothes, that is, no limitation is imposed on the clothes worn on the human body, and the clothes can be a jacket, a shirt, tight clothes, an underwear, etc. Also in order to ensure the accuracy of human body modelling, it is better to wear tight clothes, or tighten or roll up the loose parts of the clothes before photographing.

In step 102 of FIG. 1, after acquiring human body images such as 201 and 202, a human body portion and the worn clothes 203 and 204 can be respectively separated from the image backgrounds 205 and 206, so as to acquire an original profile of the human body. The original profile comprises edges of the clothes and the skin of the human body. There may be a plurality of implementations for extracting the original profile from the human body image, which can be, for example, any one of the three methods listed below.

Method I: taking a point or a line or a plane, at which the position for an operation is located, as a part of the original profile.

As an optional embodiment, one of the ways of extracting an original profile of a human body from a human body image can be detecting an operation directly or indirectly made by a user on the human body image by means of an image interaction device, such as the operations of clicking, sliding, and painting, and taking a point or a line or a plane, at which the position for the operation is located, as a part of the original profile. For example, by observing the human body image, the user can mark edges of the clothes or the skin on the human body image by means of a mouse or a touch screen device, so as to acquire the original profile. When a screen for displaying the human body image is too small, the user can enlarge the human body image by means of the mouse or the touch screen device, so as to identify and mark the edges.

Method II: manually selecting pixels as a foreground and a background respectively, for extracting the original profile As an optional embodiment, the extraction of an original profile of a human body from a human body image can be selecting, from the human body image, several pixels on the human body as a foreground and selecting several pixels other than those on the human body as a background in an interactive way, and extracting the original profile of the human body by means of an image segmentation algorithm. The image segmentation algorithm is based on the colour, the grayscale, the brightness or the gradient of pixels; and the image segmentation algorithm can be the existing Grab-cut and Graph-cut algorithms, and in this embodiment, the type of the image segmentation algorithm is not limited specifically.

Figures 3A, 3B:
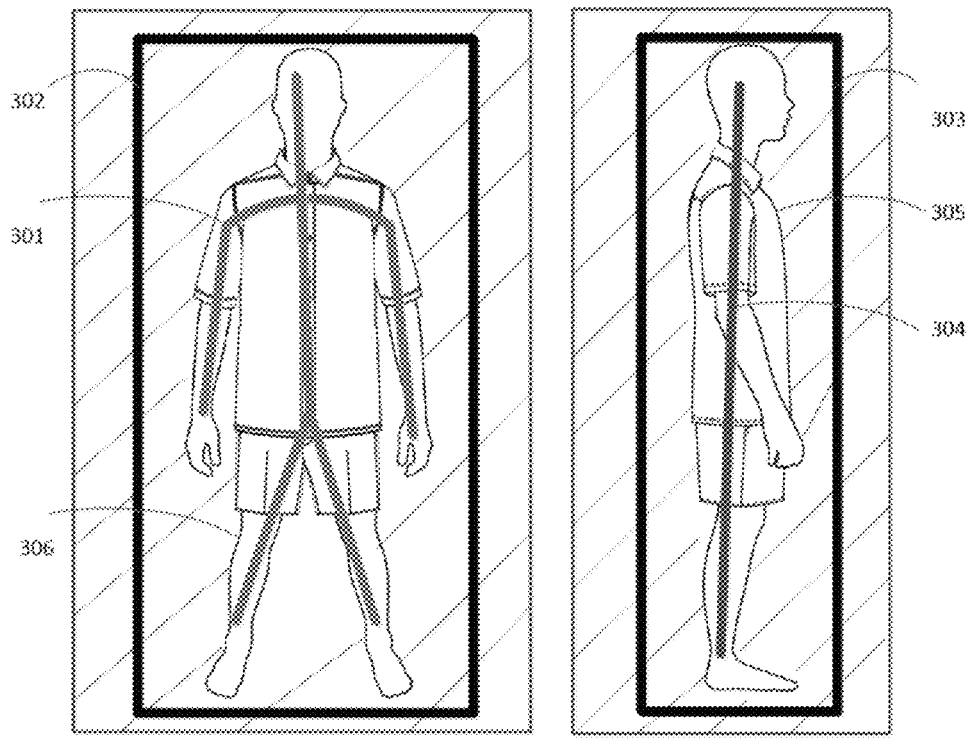

For example, as shown in FIG. 3, a user can take pixels 301 and 304 in a region, selected by using a finger on a touch screen as an image interaction device, as a foreground and also take pixels 302 and 303 in a region, selected by using a finger sliding on the touch screen as a background, and then extracting an original profile of the foreground by means of the Grab-cut algorithm according to the colour, the grayscale, the brightness and the gradient of the foreground pixels. As shown in FIG. 3(a), 306 is an original profile of a front view human body image, and as shown in FIG. 3(b), 305 is an original profile of a side view human body image.

Figure 4:
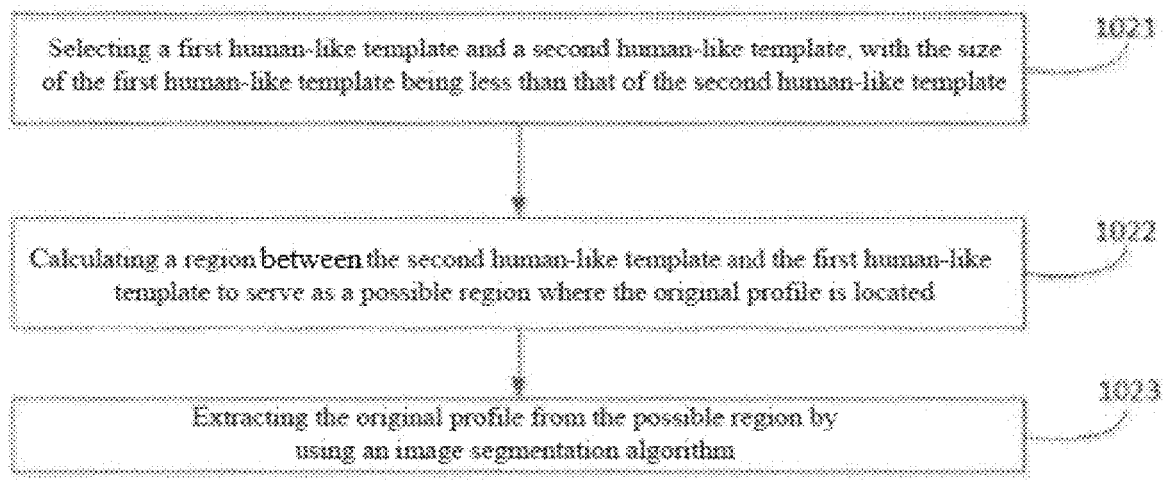

Method III: automatically selecting pixels as a foreground and a background, for extracting an original profile FIG. 4 is a schematic flowchart of a method for automatically extracting an original profile as shown according to an exemplary embodiment of the present invention. As shown in FIG. 4, the flow of the method for automatically extracting an original profile comprises the steps of:

step 1021, selecting a first human-like template and a second human-like template, with the size of the first human-like template being less than that of the second human-like template;

step 1022, calculating a region between the second human-like template and the first human-like template to serve as a possible region where the original profile is located; and step 1023, extracting the original profile from the possible region by using an image segmentation algorithm.

In step 1021 of FIG. 4, due to the different sizes of different people, the body profiles corresponding to different people are also different accordingly. Generally, most people generally have a body profile which is between a body profile of an obesity type and a body profile of a thin type. Therefore, in order to make it convenient to determine the range of the body profile, the human-like templates can be compared so as to determine a possible region where a body surface profile of a human body in the human body image is located. Two human-like templates are selected from a human-like template library to respectively serve as a first human-like template and a second human-like template. The human-like template library is composed of a plurality of images comprising two dimensional human body profiles of different sizes. The first human-like template can be an image comprising an extremely skinny human body profile, and the second human-like template can be an image comprising an extremely obese human body profile. Therefore, it is highly possible that the original profile of the human body image falls within a range between the first human-like template and the second human-like template.

Since the pixel size of the human body image is inconsistent with the size of the human-like template, before determining a possible region where the body surface profile of the human body in the human body image is located, the human-like template, such as in terms of pixel size, can be adjusted according to the position of the reference mark feature, such that the original profile is aligned with the human-like template.

As an optional embodiment, before determining, by comparing the human-like templates, the possible region where the body surface profile of the human body in the human body image is located, the method further comprises these steps of: identifying a reference mark feature in the human body image; and adjusting the first human-like template and the second human-like template based on the position of the reference mark feature. The reference mark feature comprises a point and a region, for example, the face, the feet, the leg, the hand, the shoulder, the crotch, a head vertex and a foot antapex, which are not limited specifically in this embodiment.

In the case of identifying the position where a reference mark feature of the human body image is located, the position where the body reference mark feature is located can be determined by identifying a manual operation of a user, such as operations of clicking, sliding and painting. For example, a user selects, in a way of drawing or moving a block, a head portion (a face portion) 512 in the front view human body image of FIG. 5(a) as the reference mark feature.

Figures 5A, 5B:
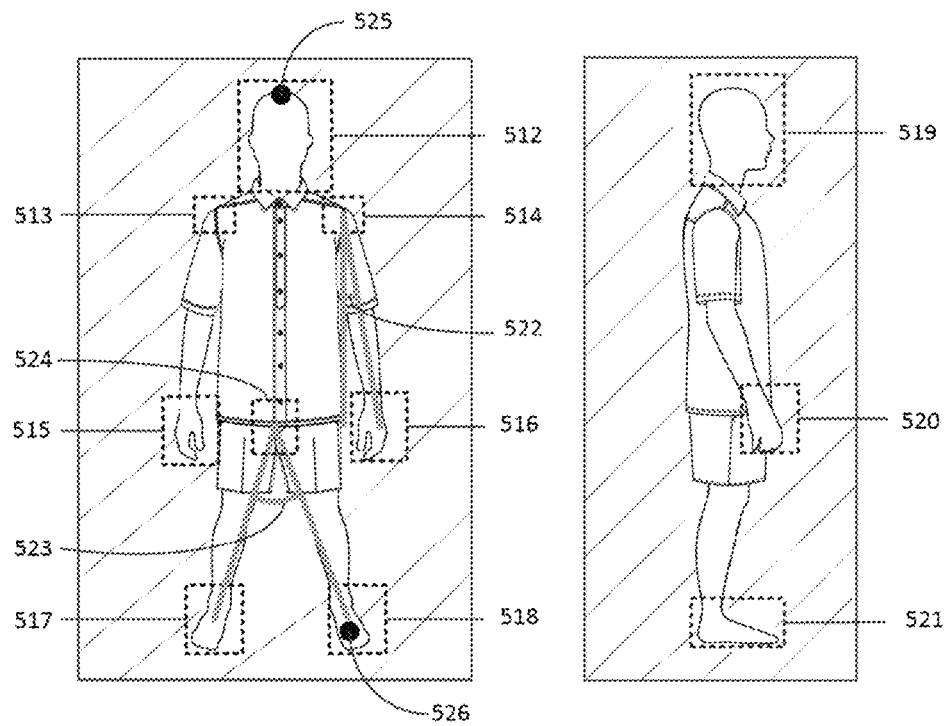

In addition to a manual selection method, the position where the reference mark feature is located can also be detected by using a human body detector. The human body detector can obtain the position by training a support vector machine by means of an Adaboost algorithm based on an image feature. The image feature may comprise but not limited to an HOG feature, a Haar feature and an LBP feature. The identified reference mark feature can be as shown in FIG. 5, and in the front view human body image of FIG. 5(a), the identified reference mark feature comprises a head 512, a left shoulder 514, a right shoulder 513, a left hand 516, a right hand 515, a left foot 518 and a right hand 517. In the side view human body image of FIG. 5(b), the identified reference mark feature comprises a head 519, a hand 520 and a foot 521.

As an embodiment, in order to narrow the range that the original profile possibly falls within, the first human-like template and the second human-like template can be selected to be installed with some human body parameters, comprising information such as the gender, the height, the weight, the body mass index, the weight, the weight range, the body size, the body-type description (such as an apple-shaped figure, a pear-shaped figure), or one or more of these can also be selected as parameters, and a corresponding first human-like template and second human-like template are selected from the human-like template library. For example, if the body mass index of a human body is 22.5, a figure with a body mass index of 20 can be selected as the first human-like template, and a figure with a body mass index of 27 can be selected as the second human-like template.

As shown in FIG. 5 (a), the height of the human body is calculated according to the pixel distance between the head vertex 525 and the foot antapex 526 in the human body image. According to the calculated height of the human body, the first human-like template and the second human-like template are scaled at an equal proportion to the same size.

Similarly, as shown in FIG. 5(a), according to the positions of the left arm 516 and the left shoulder 514, centre points of the two parts are connected, and an angle between this line segment and a vertical line segment is calculated as a first angle 522. According to the first angle, by taking the shoulder as a pivot, the arm in the human-like template is rotated at a corresponding angle so as to adjust the opening extent of the arm.

Similarly, as shown in FIG. 5(a), the position of a connection point between feet 517, 518 and the upper body (namely, the crotch 524) is calculated, and the lengths of the two legs in the human-like template are accordingly adjusted. Additionally, an angle between the two legs in the human body image is calculated as a second angle 523, and accordingly, by taking a connection point between a leg and the upper body as a pivot, the leg in the human-like template is rotated at a corresponding angle so as to adjust the opening extent of the leg.

It should be noted that since the angles regarding to the arm and the two legs are not shown in the side view human body image of FIG. 5(b), when the human-like template is compared with the side view human body image, only the size of the human-like template needs to be scaled. While the human-like template is compared with the front view human body image, both of the above-mentioned two cases might occur, that is, in this case, not only the size of the human-like template may need to be scaled, but also the positions of the arm and the legs in the human-like template may need to be adjusted.

Figure 6:
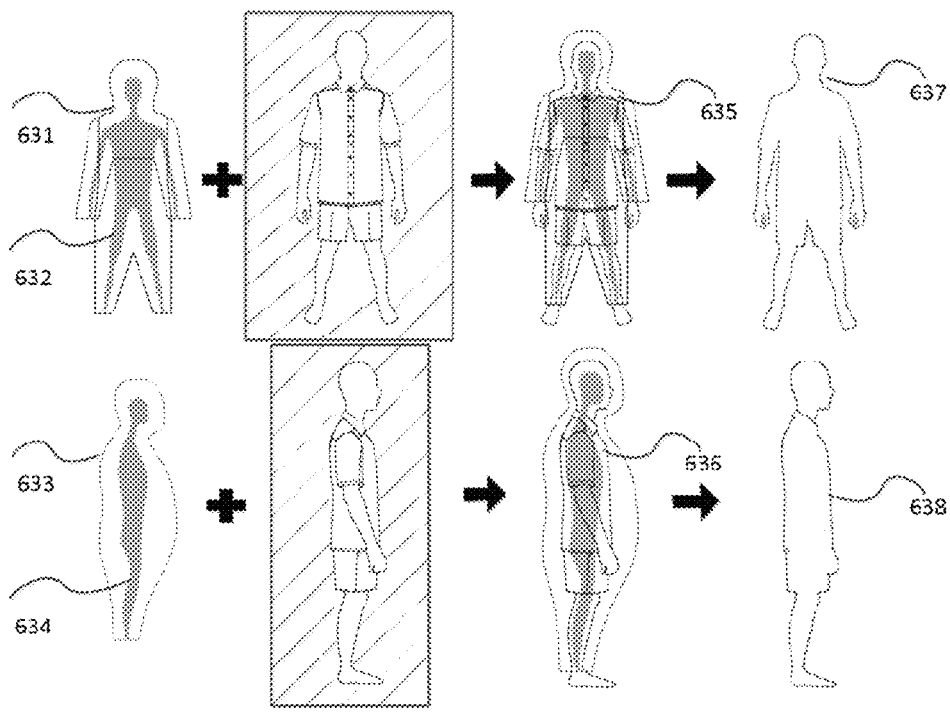
FIG. 6 is a schematic diagram of superimposing front view and side view human body images with a first human-like template and a second human-like template in an embodiment of the present invention.

After the first human-like template and the second human-like template are adjusted, based on the principle of determining the range in which the body surface profile is possibly located in the above-mentioned process, the possible region where the body surface profile of the human body in the human body image is located can be determined by comparing the human-like templates. The process comprises but not limited to: superimposing the adjusted first human-like template and second human-like template, as shown in FIG. 6, reference numeral 631 indicates a second human-like template corresponding to the front view human body image, reference numeral 632 indicates a first human-like template corresponding to the front view human body image, reference numeral 633 indicates a second human-like template corresponding to the side view human body image, and reference numeral 634 indicates a first human-like template corresponding to the side view human body image; taking a region between the second human-like template and the first human-like template after superimposing as the possible region where the body surface profile of the human body in the human body image is located. In consideration that the first human-like template corresponding to the front/side view human body image is different from the second human-like template corresponding to the side/front view human body image, during the superimposing process, the first human-like template and the second human-like template in the front view human body image can be superimposed, and the first human-like template and the second human-like template in the side view human body image can be superimposed, so as to respectively obtain a possible region. Region 635 is the possible region corresponding to the front view human body image, and region 636 is the possible region corresponding to the side view human body image.

After the possible region where the body surface profile of the human body in the human body image is determined, by applying an image segmentation algorithm to the human body image, original profiles (637, 638) corresponding to the human body image can be extracted from the possible regions (635, 636). The image segmentation algorithm can be Grab-cut and Graph-cut algorithms, and in this embodiment the type of the image segmentation algorithm is not limited specifically. Correspondingly, in FIG. 6, 637 is the original profile corresponding to the front view human body image, and 638 is the original profile corresponding to the side view human body image.

Figure 7:
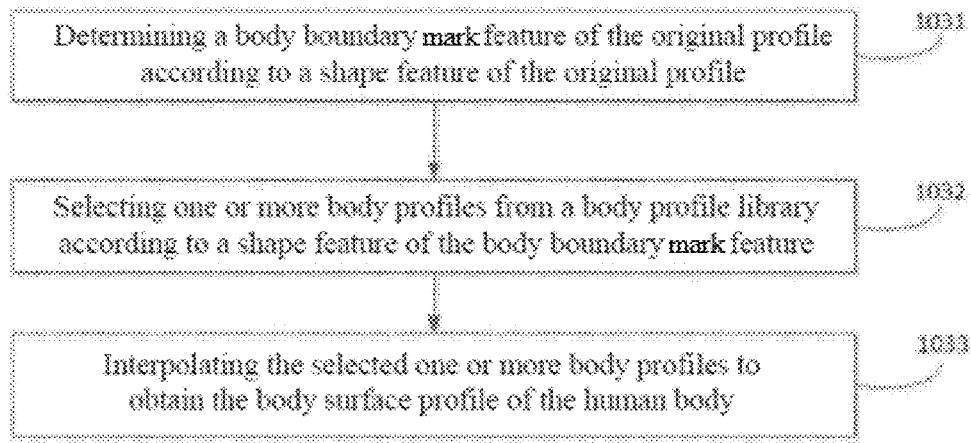
FIG. 7 is a schematic flowchart of a method for calculating a body surface profile of a human body as shown according to an exemplary embodiment of the present invention.

Returning to FIG. 1, step 103 is calculating the body surface profile of the human body according to the original profile. FIG. 7 is a flowchart of a method for calculating a body surface profile of a human body as shown according to an exemplary embodiment. As shown in FIG. 7, the flow of the method for calculating a body surface profile of a human body according to an original profile comprises the steps of:

step 1031, determining a body boundary mark feature of the original profile according to a shape feature of the original profile;

step 1032, selecting one or more body profiles from a body profile library according to a shape feature of the body boundary mark feature; and step 1033, interpolating the selected one or more body profiles to obtain the body surface profile of the human body.

It should be noted that since a human body object can be worn of any clothes during the photographing of a human body image, the original profile extracted at this time is a combination of an edge of the human body skin and an edge of the human body clothes. As a result, due to the effect of the human body clothes, there is a certain error between the original profile and a two dimensional human body profile in a real sense, namely, a body surface profile. In order to extract the body surface profile, after the original profile is obtained, a body boundary mark feature can be extracted from the original profile according to a shape feature of the original profile. The body boundary mark feature comprises a point or a region at the edge of the human body skin and a point or a region at the edge of the clothes closely fitted to the body on the original profile.

The method for specifically implementing step 1031 comprises: calculating a shape feature of a point or a region on the original profile to serve as a first shape feature; determining whether the first shape feature satisfies a pre-set condition; and determining, if the pre-set condition is satisfied, that the point or the region on the original profile serves as the body boundary mark feature. The shape feature can comprise at least one of: the curvature, the length and the position of a profile curve, a relative coordinate distance between a point or a region on the profile and a reference point, and a distance, in a transverse direction, a longitudinal direction or the other direction, between the point or the region on the profile and its corresponding point or region, and in this embodiment, the shape feature is not limited specifically.

There are a number of methods for determining whether the shape feature of an original profile satisfies a pre-set condition. For example, method I: determining whether the first shape feature is within a pre-set value range that satisfies a condition; and if so, using the point or the region on the original profile as the body boundary mark feature. The method for determining the pre-set value range can be as follow: selecting several similar body profiles from the body profile library according to the height, the weight and the age or other information of the human body; and calculating a shape feature of a point or a region on the several body profiles corresponding to that on the original profile, thereby determining the pre-set value range.

Method II: selecting one or more reference profiles similar to the original profile according to a human body parameter; calculating a shape feature of a point or a region on the reference profile corresponding to that on the original profile to serve as a second shape feature; and determining that the point or the region on the original profile serves as the body boundary mark feature if a difference value between the first shape feature and the second shape feature is less than a pre-set threshold value. The human body parameter comprises at least one of: the area enclosed by the original profile, the height of the human body or the weight of the human body.

The method for selecting a reference profile will be described in detail below. Since a body profile library contains a large number of body profiles of people with different body types, genders, ages, heights, weights and races, features contained in a body surface profile of the human body might also exist in a large number of body profiles. The method for selecting a body profile close to a morphological feature of a body surface profile of a human body comprises but not limited to: scaling body profiles in a body profile library according to the size of an original profile; calculating the areas of the original profile and a body profile; calculating the absolute difference value between the areas of the body profile and the original profile; and selecting a body profile corresponding to the smallest absolute difference value to serve as the reference profile. If the records of the body profile library also comprise information such as the height, the weight, the weight range, the body size, and the body-type description (such as an apple-shaped figure, a pear-shaped figure), one or more of these can also be selected, and a profile corresponding to the smallest absolute difference value of relevant parameters is selected from the body profile library to serve as the reference profile.

As an optional embodiment, the method is used for scaling body profiles in a body profile library according to the size of an original profile; calculating the areas of the original profile and a body profile; calculating the absolute difference value between the areas of each body profile and the original profile; and selecting a body profile corresponding to the smallest absolute difference value to serve as the reference profile. For example, calculating and obtaining the original profile with the height size of 1000 pixel pitches and the area of 134000 pixels. Each body profile in the body profile library is scaled in a height direction, at an equal proportion, to a equidistant length unit with 1000 pixels; and the corresponding scaled areas of the body profiles are calculated by means of a calculus principle, and a profile with the smallest absolute difference value between the area and the unit area 134000 is selected from all the profiles to serve as the reference profile.

As another optional embodiment, according to the height and weight (or the weight range) of a target user, a basic body-type parameter (e.g. BMI) or a basic body-type parameter range of the target user is calculated; a basic body-type parameter and a body-type parameter range of body profiles in a body profile library are calculated; several body profiles of which the body-type parameter is less than a pre-set threshold value is selected; the several body profiles are scaled according to the size of an original profile; an absolute difference value between the areas of each body profile and the original profile is calculated; and one or more body profiles where the absolute difference value is less than a pre-set threshold value is(are) selected as the reference profile. For example, if a human has a height of 170 cm and a weight of 66 kg, one or more profiles with a height close to 170 cm and a weight close to 66 kg are selected from the body profile library, and linear interpolation is performed on the profile to obtain a new profile as the reference profile.

Furthermore, according to one or more parameters such as the area of the body profile, the height, the weight, the weight range, the body mass index, the body size, the body-type description (such as an apple-shaped figure, a pear-shaped figure), etc., in a comprehensive manner, a profile corresponding to the smallest numerical value obtained by weighted summation of the absolute difference values of relevant parameters can also be selected from the body profile library to serve as the reference profile.

As shown in FIG. 8(a), by taking a point 804 on the chest of an original profile 801 as an example, a shape feature of the point 804 is calculated as a first shape feature, wherein the distance from the point 804 to the head vertex 803 is of 300 pixels, the curvature of the profile curve at the point 804 is 0.004, and the distance from the point 804 to its corresponding point 805 in a horizontal direction is of 146 pixels. If method I mentioned above is used, by taking the curvature as an example of the parameter, the curvature 0.004 of the profile curve where the point 804 is located is compared with a pre-set value range. The method for determining the pre-set value range is as follow: selecting several similar body profiles from the body profile library according to the height and weight of a human body; calculating the curvatures of the several body profiles at a part corresponding to the point 804, thereby obtaining a pre-set value range of 0.003-0.005 for the curvature of the part; and since the curvature 0.004 of the profile curve where the point 804 is located is within the pre-set value range, determining that the point 804 is a body boundary mark feature.

Similarly, according to method II mentioned above, also by taking the curvature as an example of the parameter, a reference profile is acquired according to one of the methods described above. As shown in FIG. 8(b), the profile curve curvature of a point 806 on the reference profile 802 corresponding to the point 804 is calculated to be 0.0038 as a second shape feature 0.0038. It can be seen that the absolute difference value between the first shape feature 0.0038 and the second shape feature 0.004 is less than a pre-set value 0.001, and therefore, the point 804 is determined to be the body boundary mark feature.

The above-mentioned process is repeated for the other points or regions on the original profile, such that all the body boundary mark features can be determined. It should be noted that multiple parameters, such as the curvature and distance can be simultaneously calculated for the shape feature. In this case, the determination of the point or the region on the original profile as the body boundary mark feature can comprehensively consider whether various parameters satisfy the condition at the same time, or whether the weighted sum of the difference values among various parameters is less than a pre-set value.

As another optional embodiment, the body boundary mark feature can be directly extracted from the human body image in a manual operation way, specifically comprising: when a user operation is detected on the human body image, a point or a line or a plane, at which the position for the user operation is located, is taken as a feature of the image. For example, by observing the human body image, the user can mark, by means of a mouse or a touch screen device, an edge of the skin on the human body image, an edge of the clothes closely fitted to the body, or an edge of the skin inside the clothes speculated by the user, so as to acquire the body boundary mark feature. When a screen for displaying the human body image is too small, the user can enlarge the human body image by means of the mouse or the touch screen device, so as to identify and mark the edges.

As shown in FIG. 9, when it is detected that the user operates the human body image, the positions for the operation, such as circular points 901, 902, 903 and 904 and triangular points 905 and 906, are used as the body boundary mark features, with the circular points representing close-fitting points that can be directly determined by the user by observing the image and the triangle points representing close-fitting points that are speculated by the user by means of analysis.

Returning to step 1032 of FIG. 7, one or more body profiles are selected from a body profile library according to a shape feature of the body boundary mark feature. The specific method comprises: calculating a shape feature of a point or a region, on a body profile in the body profile library, corresponding to the body boundary mark feature to serve as a third shape feature; calculating a difference value between the third shape feature and the shape feature of the body boundary mark feature; and selecting one or more body profiles with the smallest difference value.

As an embodiment, the method comprises: scaling the body profile to the same size according to a pre-set standard size of the body profile library; calculating a first relative coordinate of each body boundary mark feature relative to a reference point; determining, for a body profile in the body profile library, a corresponding point or region of each body boundary mark feature on the body profile; calculating a second relative coordinate of a point or a region on each body profile of the body profiles relative to a corresponding reference point corresponding to the reference point; calculating a difference value between the first relative coordinate and the corresponding second relative coordinate; accumulating all the difference values to serve as a profile difference value of the body profiles; and sorting the difference values of the body profiles in the body profile library, and selecting, according to the sorting result, one or more body profiles for interpolation. The calculation method for interpolation is not limited in the present invention.

For example, with reference to FIG. 10, a process for calculating a human body shape feature by using a side view body boundary feature will be illustrated. An ankle joint point 1002 is selected as a reference point. The reference point is taken as the origin of coordinates, the longitudinal direction of the position where the reference point 1002 is located is taken as a y coordinate axis, and the horizontal direction is taken as an x coordinate axis. For the convenience of description, a body boundary feature 1001 is taken as an example to calculate the first relative coordinate, and according to the pixel coordinates of the scaled image, a lateral vector 1003 from a point 1001 of the body boundary feature to the reference mark point 1002 is calculated as dx, and a vertical vector 1004 is calculated as dy. Therefore, it can be derived that the first relative coordinate of the body boundary feature 1001 is (dx, dy). In the same manner, the first relative coordinate of each body boundary mark feature relative to the reference point 1002 can be calculated.

Similarly, the second relative coordinate is calculated. Firstly, by performing body profile parameterization on each body profile in the body profile library, a corresponding point or region of each body boundary mark feature on the body profile in the body profile library can be determined, so that the second relative coordinate of the point or region relative to the corresponding reference point corresponding to the reference point can be calculated as (dx-i, dy-i), wherein i represents the ith body profile in the body profile library. A profile difference value dsum-i of the body profile can be obtained by calculating a difference value between the second relative coordinate of the body boundary mark feature corresponding to each body profile and the corresponding first relative coordinate, and then accumulating the difference values. The difference value may be the distance between two points, which is not specifically limited in this embodiment. After the profile difference values of the body profiles in the body profile library are determined, all the profile difference values may be sorted in an ascending order, so as to select one or more body profiles having the smallest profile difference value.

The number of the profiles is an integer greater than or equal to 1, and when the value of the number of the profiles is larger, the body surface profile obtained subsequently may also be more precise, and the specific value can be set according to requirements, which is not specifically limited in this embodiment.

It should be noted that the body profile comprises the overall body profile and a local body profile, which are not specifically limited in this embodiment. The overall body profile refers to the entire front view or side view human body profile; and the local body profile refers to a portion of the overall profile, such as a section of a waist line to a hip line in the overall profile.

Returning to step 1033 of FIG. 7, the selected one or more body profiles are interpolated to obtain a body surface profile of the human body. The interpolation algorithm may be a linear or non-linear interpolation algorithm, a weighted or a common interpolation algorithm, which is not specifically limited in this embodiment.

For example, if N front view body profiles C1, . . . , Cn are selected, then a two dimensional front view human body profile X with no clothes can be calculated by the following linear formula:

$$X = w1 \cdot C1 + \ldots + wn \cdot Cn \quad \text{Formula 1}$$

where w1, . . . , wn are weight values, and the weight can be an average value, and can also be inversely related to a profile difference value. For example, the weight value of an ith front view profile is calculated by the following formula $$wi = \frac{\frac{1}{f_i}}{\frac{1}{f_1} + \ldots + \frac{1}{f_n}} \quad \text{Formula 2}$$

fi is a profile difference value of the ith front view profile.

As shown in FIG. 11, based on a front view human body image and a side view human body image, a body surface profile obtained after interpolation may comprise a front view body surface profile 1101 and a side view body surface profile 1102.

Returning to step 104 of FIG. 1, a three dimensional human body model is constructed according to the body surface profile. As an embodiment, the flow of the method for constructing the three dimensional human body model according to the body surface profile comprises the steps of:

step 1041, constructing a three dimensional human body figure frame according to the body surface profile; and step 1042, constructing the three dimensional human body model based on the three dimensional human body figure frame.

In step 1041 above, a three dimensional human body figure frame is constructed according to the body surface profile. FIG. 12 is a reference for the implementation process. FIG. 12 presents a flowchart for a method for constructing a three dimensional human body figure frame in an exemplary embodiment. As shown in FIG. 12, the flow of the method for constructing a three dimensional human body figure frame comprises the steps of:

step 10411, calculating morphological feature data of sections of different human body parts according to the body surface profile;

step 10412, constructing the shapes of the sections of the different human body parts according to the morphological feature data of the sections of the different human body parts;

step 10413, arbitrarily selecting one of all the constructed sections as a reference section, and calculating position coordinates of the other sections relative to the reference section; and step 10414, connecting, based on a pre-defined grid structure and according to position coordinates of all the sections, all the sections to serve as the three dimensional human body figure frame.

In step 10411 of FIG. 12, morphological feature data of sections of different human body parts is calculated according to the existing body surface profile. The human body section can be divided into two types, with one being a feature section, which refers to a section of a special body part. As shown in FIG. 13, the section having features in the side view body surface profile may include, but is not limited to, a neck section 1301, a shoulder section 1302, an upper chest section 1303, a chest section 1304, a lower chest section 1305, a waist section 1306, a low waist section 1307, an upper hip section 1308, a hip section 1309, a crotch section 1310, a knee section 1311, a calf section 1312, and an ankle section 1313, etc. The section having features in the front view body surface profile may include, but is not limited to, an upper arm section 1314, an elbow joint section 1315, and a wrist section 1316. The other one is a non-feature section, which refers to a body section between two adjacent special body part sections, such as body sections 1317 and 1318 between the lower chest section and the waist section.

As an embodiment, in order to calculate a corresponding position of the body surface profile at the height of the human body section, a height position of each section may be determined according to a human body proportion and a change feature of the tangent or normal of part of the curves. As shown in FIG. 14, a corresponding height of the hip section can be calculated by calculating the most prominent point 1401 of a posterior curve segment of the side view human body surface profile at the position of 33% to 44% of the height from the bottom of the foot, and the calculation method can involve conducting a first derivative of the curve and taking a height position of a point with a derivative of zero as a height position 1402 of the hip section. Then, based on the height position of the section, the morphological feature data of the section corresponding to the body surface profile is calculated. The morphological feature data may be one or more of the following: the width of the section, the thickness of the section, the areas of the front view and side view body surface profiles, or a height position of the section at the body surface profile (for example, the ratio of the height for the chest section, and the height of the chest line), etc., and in this embodiment, the content of the morphological feature data is not specifically limited.

For example, in order to calculate the morphological feature of a hip section, a horizontal straight line can be made at the hip height position; two left and right intersections at the boundaries of the front view body surface profile with the straight line are calculated, and a horizontal pitch of the left and right intersections is calculated as a width 1403 of the hip circumference section; and two left and right intersections at the boundaries of the side view body surface profile with the straight line can also be calculated, and a horizontal pitch of the left and right intersections is calculated as a thickness 1404 of the hip circumference section (FIG. 14).

As another embodiment, the areas of the front view and side view body surface profiles can be calculated by means of the calculus principle.

Returning to step 10412 of FIG. 12, the shapes of the sections of the different human body parts are constructed according to the morphological feature data of the sections of the different human body parts.

As an embodiment, the construction of the shape of a section is based on a linear or non-linear relationship model describing the morphological feature of the section and a shape parameter for the section. The relationship model is obtained based on the training of a section database, and the section database is obtained by cutting out corresponding position sections of several three dimensional real-human scanning data.

For the convenience of description, any section is now selected and the shape feature data of the section is calculated. Specifically, a set of sectional shape parameters are determined based on the calculated sectional shape data and a linear or non-linear relationship model obtained by the corresponding training. The sectional shape parameter may describe the distance from each section boundary point on the section to a centre point of the section. Based on the distance and the position of the centre point of the section and the direction of each section boundary point with respect to the centre point, the position of each section boundary point can be determined. Various section boundary points are connected in an orderly way to form a polygon, that is, the shape of the section.

As shown in FIG. 15, based on morphological data of a waist section and the relationship model, a shape parameter for the section is calculated. The shape parameter comprises the distance from each section boundary point on the section to the centre point c 1501 of the section, for example, a distance d1 between a section boundary point p1 1505 to the centre point c 1501, and another distance d2 between a section boundary point p2 1507 to the centre point c 1501, and so on, a distance di 1502 between pi 1504 and c 1501, and a distance do between pn 1506 and c 1501. Assuming that angles formed between every two adjacent section boundary points and the centre point c 1501 are equal and equal to 1°, the section has 360 section boundary points in total, that is, n is equal to 360. Therefore, an angle formed between the section boundary point pi 1504 and the x-axis is (i−1°). The relative position of the section boundary point pi 1504 relative to the centre point c 1501 can be determined in conjunction with the calculated distance di. By analogy, the relative positions of various section boundary points are calculated. The calculated 360 section boundary points are connected to form a polygon, that is, the shape of the waist section. Similarly, the shape parameters for the sections at different positions are calculated to construct the shapes of various sections of a human body.

Returning to step 10413 of FIG. 12, one of all the constructed sections is arbitrarily selected as a reference section, and position coordinates of the other sections relative to the reference section are calculated. After the construction of all the sections is completed, and after a reference section is selected from all the constructed sections, an xyz spatial coordinate system may be established according to xy coordinate axes parallel to the reference section, a z coordinate axis perpendicular to the reference section, and by taking a section centre point of the reference section as the origin, thereby determining positions coordinates of the other sections relative to the reference section. Finally, according to the positions coordinates of all the sections, all the sections are connected on the basis of a pre-defined grid structure, thereby obtaining a three dimensional human body figure frame.

The predefined grid structure is a grid frame that connects body surface top vertexes of the human body according to a certain topological structure and contains body-type information.

As shown in FIG. 16, by taking a section 1601 of the waist as the reference section, and taking a centre point of the waist section as the origin of the xyz spatial coordinate system, the coordinate position of a point A at the rearmost of the reference section can be calculated as A (x1, y1, z1). Now, by taking a hip section 1602 as an example, the position coordinates of the hip section relative to the reference section are calculated. The coordinates of a point B at the rearmost of the hip relative to a centre point of the waist section is calculated as B (x2, y2, z2) according to the shape of the section; a translation vector T(xt, yt, zt) of the point B relative to the point A is obtained according to the front view and side view body surface profiles; and the position coordinates (xp+x1+xt−x2, yp+y1+yt−y2, zp+z1+zt−z2) of any point P (xp, yp, zp) on the waist section relative to the origin can be obtained according to vector translation.

In step 10414 of FIG. 12, based on a pre-defined grid structure and according to the position coordinates of all the sections, all the sections are connected to serve as the three dimensional human body figure frame. As shown in FIG. 17, 1701 in FIG. 17 (*a*) is a front view of the three dimensional human body figure frame, and 1702 in FIG. 17 (*b*) is a side view of the three dimensional human body figure frame. As an embodiment, the predefined grid structure is configured to orderly connect adjacent points in a clockwise or counterclockwise way according to a logical topology of the human skin surface, so as to serve as a patch.

In step 1042 for performing step 104 of FIG. 1, a three dimensional human body model is constructed based on the three dimensional human body figure frame. FIG. 18 is a flowchart of a method for constructing a three dimensional human body model as shown according to an exemplary embodiment. As shown in FIG. 18, the flow of the method for constructing a three dimensional human body model comprises the steps of:

step 10421, selecting a three dimensional human body template model according to human body reference information;

step 10422, constructing a first frame for the three dimensional human body template model, with the first frame having the same grid structure as the three dimensional human body figure frame;

step 10423, associating a point in the three dimensional human body template model with at least one patch having a closest relative position in the grid structure of the first frame; and step 10424, calculating, according to the obtained association relationship and based on the three dimensional human body figure frame, a new coordinate of each point in the three dimensional human body template model, and constituting the three dimensional human body model by all the points that have new coordinates.

In step 10421 above, a three dimensional human body template model is selected according to human body reference information. The human body reference information may include the contents of the gender, the age, the race, the height, the weight, etc., which are not specifically limited in this embodiment. If the human is a male, has an age of 29, a height of 170, and a weight of 65 kg, a three dimensional human body, with a male age interval being between 20 and 35 years old, and the BMI being between 23 and 26, is selected from a three dimensional human body database to serve as a template model; for another example, according to the volume of the three dimensional human body figure frame, a three dimensional human body model with similar volume can be selected as the template model. For example, if the volume of a three dimensional profile of the human body is calculated to be 0.0743 cubic meters by means of the calculus principle, a model of the same gender with a volume of 0.07 to 0.08 cubic meters of the three dimensional human body model is selected from a human body database to serve as the template model.

In step 10422 of FIG. 18, based on the selected three dimensional human body template model, a first frame is constructed for the three dimensional human body template model, with the first frame having the same grid structure as that of the three dimensional human body figure frame. As an embodiment, the construction method can involve: extracting side view and front view body surface profiles of a three dimensional human body template model; determining the position of a section corresponding to a three dimensional human body profile based on the body surface profiles, such as a height position of a waist section; then extracting a peripheral boundary point set of the section on the three dimensional template model; by means of a curve fitting method, fitting the peripheral boundary point set as a control point into a complete boundary curve of the corresponding section; based on the complete boundary curve and by means of a sampling method, calculating shape boundary points of the section corresponding to the three dimensional human body frame, such as polygon boundary points, and connecting the polygon formed by the shape boundary points to serve as the section of the first frame. All corresponding sections of the three dimensional human body template model are connected according to a predefined grid structure, so as to form the first frame.

In step 10423 of FIG. 18, based on the first frame, an calculation is conducted for the association of each point on the three dimensional human body template model with at least one patch having the closest relative position of the grid structure on the first frame, so as to obtain an association relationship. Based on the association relationship and a vertex coordinate of the patch of the three dimensional human body figure frame, a new coordinate of each point in the three dimensional human body template model is calculated, and the three dimensional human body model is constituted of all the points that have new coordinates.

For the convenience of description, any point is now selected; and as shown in FIG. 19, p (x,y,z) is a point on the three dimensional human body template model, and a triangle T1 (a, b, c) is a patch near the point p on the first frame (the shape of the patch is not limited here, that is, it can be a quadrilateral, a polygon and a curved patch). Top coordinates are ($p_a$, $p_b$, $p_c$), ab and ac are vectors of sides of the triangle T1, and N is a normal vector of the patch. Based on the three vectors, a local coordinate system can be constructed. Based on the local coordinate system, by using the formula SYOx, the relative position R1 (u1, v1, w1) of the point p with respect to the patch T1 can be calculated by the following formula $$p = p_a + u1 \cdot \vec{ab} + v1 \cdot \vec{ac} + w1 \cdot \vec{N} \qquad \text{Formula 3}$$

R1 (u1, v1, w1) is used as the association of the patch.

According to the association and top coordinates of the corresponding triangular patch T1' (a', b', c') of the three dimensional human body figure frame, a coordinate position of the point p relative to the coordinate system of TV can be calculated, and the formula is as follows:

$$p1 = p_a' + u1 \cdot \vec{a'b'} + v1 \cdot \vec{a'c'} + w1 \cdot N' \qquad \text{Formula 4}$$

where $p_a'$, $p_b'$ and $p_c'$ are top coordinates of T1', a'b' and a'c' are vectors of sides of the triangle TV, and N' is a normal vector of the T1' patch.

If new coordinate point sets of the point p relative to several (one or more) patches are p1, . . . , pn, the new coordinates of the point p can be calculated by means of the following formula $$p' = w1 \cdot p1 + \ldots + wn \cdot pn \qquad \text{Formula 5}$$

where w1 is a weight, for example, the weight may be 1/n, or may be made according to the distance from a point p to the centre of gravity of the patch, for example, the weight value of the ith front view profile is calculated by the following formula $$wi = \frac{\frac{1}{f_i}}{\frac{1}{f_1} + \ldots + \frac{1}{f_n}} \qquad \text{Formula 6}$$

fi is the distance from the point p to the centre or the centre of gravity of an ith patch.

After the calculation of new coordinates of all points of the three dimensional human body template model, all the points with the new coordinates are composed to obtain a three dimensional human body model. In consideration that after the new coordinates of each point are calculated, the three dimensional human body model composed of all the points with the new coordinates may not match the actual human body in size. Therefore, after the three dimensional human body model is obtained, the three dimensional human body model can be scaled according to the distance between the human and a photographing camera and the height of the human body, so as to achieve a calibration effect.

If the height of the three dimensional human body model composed of the new coordinates is 170 cm, while the height data of the human body is 180 cm, scaling is performed at a ratio of 18/17 with a global centre of the composed three dimensional human body model. FIG. 20 shows a three dimensional human body model acquired based on the above-mentioned human body modelling method. 2001 in FIG. 20 (*a*) is a front view of the three dimensional human body model, and 2002 in FIG. 20(*b*) is a side view of the three dimensional human body model.

It should be noted that since the three dimensional human body model may be used in various fields in the subsequent processing processes, when the three dimensional human body model is put into actual application, measurement data of the three dimensional human body model is more used. The measurement data may be a one dimensional, two dimensional or three dimensional human body size. The one dimensional measurement size may be, for example, the length or angle of a non-closed curve, a closed curve, the curvature, and a line segment, the two dimensional measurement size may be, for example, a sectional area and a surface area, and the three dimensional measurement size may be, for example, a capacity, and these are not specifically limited in this instance. In order to facilitate the subsequent use of the three dimensional human body model, this embodiment further provides a method for extracting measurement data of the three dimensional human body model, the method comprising: determining geometric positions of key points or key features on the three dimensional human body model; and calculating measurement data of the three dimensional human body model according to the geometric positions of the key points or the key features.

Before the calculation of the measurement data of the three dimensional human body model, in order to determine which types of measurement data need to be calculated subsequently, the measurement data may be pre-classified, for example, they may be classified as a closed plane curve, a closed curve, a non-closed curve, a straight line, an angle, a cross sectional area, a surface area, and a capacity, and this is not specifically limited in this embodiment. The human body measurement standard is mainly used to standardize the criterion for measurement of human body size data. The human body measurement standard can be an international human body measurement standard, such as the ISO8559 standard, and can also be a national or regional human body measurement standard, such as the US ASTM (American Society for Testing and Materials) D5219-09 standard, or the locally corresponding human body measurement standards in China, Japan, and Europe, and arbitrarily customized measurement standards, and this is not specifically limited in this embodiment.

According to the above-mentioned human body measurement standard and common knowledge for human body measurement, key points or key features on the three dimensional human body model can be determined. The key points may be a back neck point, a side neck point, a shoulder point, etc., and the key features may be a hip level feature, an abdominal level feature, an ankle level feature, an axillary feature, etc., which are not specifically limited in this embodiment. For example, by extracting a curve (for example, a back curve in a side view direction), in a back direction, of the side of the three dimensional human body model, a horizontal position at which the most prominent point is found at a human body height ratio of 40% to 60% of the curve (the calculation method can involve conducting a first derivative of the curve and taking a height position with a derivative of zero as the height position of the hip section) is determined as the hip level feature; and for another example, by calculating and extracting a curve, in a front direction, of the side of the three dimensional human body model, a horizontal position at which the most prominent point is found at a human body height ratio of 50% to 70% of the curve is determined as the abdominal level feature.

The geometric position of each key point or key feature is determined. After the coordinates are established for the three dimensional human body model, the geometric positions of key points or key features can be determined by identifying different point or region features of the three dimensional human body model. For example, a geometric position of a back neck point can be determined by calculating the circumference of all sections with a spacing of 3 mm within the range of 80% to 83% of the human body height ratio, and determining, according to a circumference change rate feature of a section where the back neck point is located, the section where the back neck point is located, and then finding geometric coordinates of points at the rear on left and right symmetry line of the section.

As another example, the geometric positions of key points or key features can be selected manually, including in a touching, clicking, sliding, and painting manner. For example, a geometric position of a back neck point can be determined by rotating and translating a three dimensional human body model view to the back, scaling the view to the vicinity of the back neck point and then clicking the back neck point.

Measurement data of a three dimensional human body model is calculated according to the geometric position of each key point or key feature. After the geometric position of each key point or key feature is determined, the corresponding measurement data can be calculated by using an algorithm corresponding to the classified measurement data. For example, a calculus method can be used to calculate the lengths of a closed curve, a non-closed curve and a line segment, and the area of the section and the surface, which are not specifically limited in this embodiment. For example, in order to calculate a waist length, a section can be taken at a waist level feature of the human body model, points at the sectional profile are curve-fitted to obtain a waist curve, and finally the circumference of the curve is calculated by means of the calculus method to serve as the waist length.

As an optional embodiment, after the measurement data of the three dimensional human body model is acquired, the measurement data can be further converted according to a human body size standard. For example, the human is a male, with a height of 170 cm, a chest circumference of 88 cm, and a waist circumference of 74 cm, and according to the National Standard of the People's Republic of China GB/T 1335.1-2008, the clothing number of the human body is 170/88A. In this embodiment, the size standard is not limited, and may be, for example, an European size standard (EN13402-3 2013) or an American size standard (ASTM D6240 2012).

The method provided in the embodiments of the present invention comprises: acquiring at least one human body image; extracting an original profile of a human body from the human body image; calculating a body surface profile of the human body according to the original profile; and constructing a three dimensional human body model according to the body surface profile. Since the establishment of the three dimensional human body model in the present invention originates from two dimensional human body images, without using a human body scanner to scan a human body, the cost expense of establishing the three dimensional human body model is reduced. Moreover, since there is no requirement for the position of a human body object and for the dressing of the human body object when a human body image is acquired, the operation threshold for establishing a three dimensional human body model is lowered, and the process of establishing the three dimensional human body model is more convenient.

In addition, in the process of extracting a two dimensional human body profile, an original profile extracted possibly with the edge of the clothes is corrected, and based on feature points obtained after correction, the two dimensional human body profile is further selected and synthesized by means of an interpolation operation, so that the two dimensional human body profile is closer to the real human body profile. By constructing a three dimensional figure frame according to the two dimensional human body profile and deforming the selected human body model according to the three dimensional figure frame, the features of the human body model can be further filtered and screened, so that the obtained three dimensional human body model is closer to the real human body. In summary, after the further precisions brought about by each step of processing process above, the finally constructed three dimensional human body model can be enabled to have a higher restoration degree and less errors.

In a schematic logic block diagram of an exemplary embodiment of a human body modelling apparatus of the present invention as shown in FIG. 21, the apparatus comprises a human body image acquisition module 2101 for acquiring at least one human body image; an original profile extraction module 2102 for extracting an original profile of a human body from the human body image; a body surface profile calculation module 2103 for calculating a body surface profile of the human body according to the original profile; and a three dimensional model construction module 2104 for constructing a three dimensional human body model according to the body surface profile.

In another exemplary embodiment of the human body modelling apparatus of the present invention as shown in FIG. 22, subsequent to the construction module 2104, a first determination module 2201 for determining geometric positions of key points or key features on the three dimensional human body model, and a second calculation module 2202 for calculating the measurement data of the three dimensional human body model according to the geometric positions of the key points or the key features are further connected. In another exemplary embodiment of the human body modelling apparatus of the present invention, the second calculation module 2202 is further provided with a data conversion module for converting the measurement data according to a human body size standard.

It would be appreciated that the modules may be in communication and operate within the same apparatus, or alternatively may be distributed between network-coupled computer systems so that the computer readable code is stored and executed in a distributed fashion by modules which are geographically remote from some or each other module. For example, the image acquisition device may be configured to acquire the image and transmit this image to a remotely located server in which the modules are located.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

One or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices.

In a schematic logic block diagram of an embodiment of an electronic device of the present invention as shown in FIG. 23, it comprises a memory 2401, a processing component 2402, a multimedia component 2403, and one or more programs 2405 running on the processing component 2402. The one or more programs 2405 are stored in the memory 2401 and are configured to provide a user interaction interface by the multimedia component 2403; and the processing component 2402 executes the one or more programs 2405 for performing at least one of the following operations: acquiring at least one human body image; extracting an original profile of a human body from the human body image; calculating a body surface profile of the human body according to the original profile; and constructing a three dimensional human body model according to the body surface profile. It would be appreciated the in the embodiment depicted, such components may be physically located on the same device, although dispersed components communicatively coupled with each other could also provide the same functionality without departing from the present disclosure.

The memory 2401 is configured to store various types of data to support operations at the electronic device. Examples of such data include instructions for any application program or method operating on the electronic device, contact data, phone book data, messages, pictures, videos, etc. The memory 2401 can be implemented by any type of volatile or non-volatile storage devices or a combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or optical disc. The processing component 2402 typically controls the overall operation of the electronic device, such as operations associated with displaying, telephone calls, data communications, camera operations and recording operations. The processing component can include one or more processors to execute the instructions, so as to complete all or part of the steps of the methods described above. In addition, the processing component can include one or more modules to facilitate the interaction between the processing component and the other components. For example, the processing component can include a multimedia module and a communication module to facilitate the interaction between the processing component and the multimedia component or the communication component, respectively.

The processing component 2402 in FIG. 23 can be a mobile phone, a computer, a digital broadcast terminal, a message transceiving device, a gaming console, a tablet device, a medical device, a fitness device, a personal digital assistant, etc. In an exemplary embodiment, the electronic device may be implemented by one or more application-specific integrated circuits (ASIC), a digital signal processor (DSP), a digital signal processing device (DSPD), a programmable logic device (PLD), a field-programmable gate array (FPGA), a controller, a microcontroller, a microprocessor, or the other electronic elements for executing the above-mentioned method.

The multimedia component 2403 comprises providing an output and/or output interface between the electronic device and a user. In some embodiments, the multimedia component 2403 can comprise a liquid crystal display (LCD) and a touch panel (TP). If the multimedia component comprises a touch panel, the multimedia component can be implemented as a touch screen to receive an input signal from the user, so as to achieve man-machine interaction. The touch panel comprises one or more touch sensors to sense touching, sliding and gestures on the touch panel. The touch sensor may not only sense the boundary of a touching or sliding action, but also detect the duration and pressure related to the touching or sliding operation.

In another embodiment of the electronic device of the present invention, the electronic device includes one or more of the following components: a memory, a processing component, a multimedia component, and a communication component 2404. Moreover, the communication component 2404 is configured to: provide a bidirectional communication link between the electronic device and a server; transmit data which is sent by the electronic device to the server; and receive data which is sent by the server to the electronic device.

The sending data includes, but is not limited to, data acquired or processed by the processing component. As an optional embodiment, the sending data includes, but is not limited to: the at least one human body image, the original profile of the human body in the human body image, the body surface profile of the human body, the three dimensional human body model, or information about the human body in the human body image. The information about the human body in the human body image includes, but is not limited to: the height, the weight, the age, the gender and the race.

The receiving data includes, but is not limited to, data acquired or processed by a server. As an optional embodiment, the receiving data includes, but is not limited to: the at least one human body image, the original profile of the human body in the human body image, the body surface profile of the human body, the three dimensional human body model, or information about the human body in the human body image. The information about the human body in the human body image includes, but is not limited to: the height, the weight, the age, the gender and the race.

The communication component 2404 is configured to facilitate a wired or wireless communication between the electronic device and the other devices. The electronic device can access a communication standard-based wireless network, such as Wi-Fi, 2G, 3G, 4G, 5G, or a combination.

A person of ordinary skill in the art would have been able to understand that all or a part of steps of the foregoing embodiments can be implemented by means of hardware or by means of a program to instruct relevant hardware. The program can be stored in a computer readable storage medium, and the storage medium mentioned above may be a read-only memory, a magnetic disk or an optical disc, etc.

The above-mentioned contents are merely preferred embodiments of the present invention and are not used to limit the present invention. Any modification, equivalent replacement, improvement, etc. made within the range of the spirit and principle of the present invention should be included in the scope of protection of the present invention.

The invention claimed is:

1. A method of modelling a body of a human subject using at least one or more electronic devices comprising the steps of:
    acquiring at least two two-dimensional images of the body of the human subject by an image acquisition means of the at least one or more electronic devices, wherein said acquired two-dimensional images are acquired from different relative positions of the image acquisition means to the human subject;
    automatically extracting using a processor of the at least one or more electronic devices two dimensional original profiles of the body of the human subject from each two dimensional acquired image;
    generating using a processor of the at least one or more electronic devices a two-dimensional body surface profile of the body of the human subject for each two dimensional original profile extracted from the acquired images by:
    (i) automatically determining a plurality of body boundary mark features on the two dimensional original profile by comparing one or more shape features of a point or region on the original two dimensional profile against corresponding shape features which comprise body boundary mark features on a reference two dimensional profile selected according to a human body parameter from a database of reference body profiles, wherein said human body parameter comprising the area enclosed by the original profile, the height of the human body or the weight of the human body;
    (ii) selecting one or more two dimensional body profiles from a library, by calculating the difference between the shape features of the determined plurality of body boundary mark features of the original two dimensional profile and the corresponding shape features of body profiles in said library;
    (iii) interpolating the selected body profiles to generate a two-dimensional body surface profile of the body of the human subject body of the human subject; and
    constructing using a processor of the at least one or more electronic devices a three-dimensional human body model from each of the interpolated two-dimensional body surface profiles of the human subject.

2. The method of claim 1, wherein after constructing a three dimensional human body model according to the body surface profiles, the method further comprises the steps of:
    determining geometric positions of key points or key features on the three dimensional human body model using a processor of the at least one or more electronic devices; and
    calculating using a processor of the at least one or more electronic devices the measurement data of the three dimensional human body model according to the geometric positions of the key points or the key features.

3. The method of claim 1 wherein after calculating measurement data of the three dimensional human body model, the method further comprises the steps of:
    converting using a processor of the at least one or more electronic devices the measurement data according to a human body size standard.

4. The method of claim 1 wherein the step of extracting the original profile from each acquired image comprises:
when a user operation is detected on the acquired image displayed on the electronic device, taking a point or a line or a plane, at which the position for the operation is located, as a part of the original profile.

5. The method of claim 1, wherein the step of extracting the original profile from each acquired image comprises:
extracting, in combination with an image segmentation algorithm, the original profile from the acquired image when a foreground and a background selected by a user are detected on the acquired image.

6. The method of claim 1, wherein the steps of extracting the original profile from each acquired image comprises:
selecting a first human-like template and a second human-like template, with the size of the first human-like template being less than that of the second human-like template;
calculating using a processor, a region between the second human-like template and the first human-like template to serve as a possible region where the original profile is located; and
extracting the original profile from the possible region by using image segmentation.

7. The method of claim 6, wherein before the step of calculating a region where the second human-like template is larger than the first human-like template, the method further comprises the steps of:
identifying using a processor a reference mark feature in the acquired image; and
adjusting the first human-like template and the second human-like template based on the position of the reference mark feature.

8. The method of claim 7, wherein the step of adjusting the human-like templates comprises the steps of:
calculating a pixel distance between the face and feet in the acquired image; and
scaling the first human-like template and the second human-like template based on the pixel distance.

9. The method of claim 7, wherein the step of adjusting the human-like templates further comprises the steps of:
calculating an angle between an arm and the body in the acquired image, and correspondingly adjusting the positions of arms in the first human-like template and the second human-like template; and
calculating an angle between legs in the acquired image, and correspondingly adjusting the positions of legs in the first human-like template and the second human-like template.

10. The method of claim 1 wherein the shape feature comprises at least one of:
a relative coordinate distance between the point or the region on the profile and a reference point;
the curvature of the point or the region on the profile;
or a distance between the point or the region on the profile and its corresponding point or region.

11. The method of claim 1, wherein the step of comparing one or more shape features of a point or region on the original two dimensional profile against corresponding shape features which comprise body boundary mark features on the selected reference two dimensional profile comprises:
determining that the shape features of the point or the region on the original profile serve as the body boundary mark feature if a difference value between the first shape feature and the second shape feature on the selected reference two dimensional profile is less than a pre-set threshold value.

12. The method of claim 1, wherein said step of selecting one or more body profiles from the body profile library according to the shape feature of the body boundary mark feature comprises the steps of:
calculating a shape feature of a point or a region, on a body profile in the body profile library, corresponding to the body boundary mark feature to serve as a third shape feature;
calculating a difference value between the third shape feature and the shape feature of the body boundary mark feature; and
selecting one or more body profiles with the smallest difference value.

13. The method of claim 1, wherein the step of constructing the three-dimensional human body model according to the body surface profile comprises the steps of:
constructing a three-dimensional human body figure frame according to the body surface profile; and
constructing the three-dimensional human body model based on the three-dimensional human body figure frame using a processor.

14. The method of claim 13, wherein the step of constructing a three-dimensional human body figure frame according to the body surface profile comprises the steps of:
calculating using a processor, a plurality of morphological feature data of sections of a human body in different positions according to the body surface profile;
constructing the shapes of the sections of the different human body parts according to the morphological feature data of the sections of the different human body parts using a processor;
arbitrarily selecting one of all the constructed sections as a reference section, and calculating position coordinates of the other sections relative to the reference section; and
connecting, based on a pre-defined grid structure and according to position coordinates of all the sections, all the sections to serve as the three-dimensional human body figure frame.

15. The method of claim 13, wherein the step of constructing the three-dimensional human body model based on the three-dimensional human body figure frame comprises the steps of:
selecting a three-dimensional human body template model according to human body reference information;
constructing a first frame for the three-dimensional human body template model, with the first frame having the same grid structure as the three-dimensional human body figure frame;
associating a point in the three-dimensional human body template model with at least one patch having a closest relative position in the grid structure of the first frame; and
calculating using a processor, according to the obtained association relationship and based on the three dimensional human body figure frame, a new coordinate of each point in the three dimensional human body template model, and constituting the three-dimensional human body model by all the points that have new coordinates.

16. An apparatus for modelling a body of a human subject using at least one or more electronic devices comprising:
an acquisition module configured for acquiring at least two two-dimensional images of the body of the subject by an image acquisition means of the at least one or more electronic devices, wherein said acquired two-dimensional images are acquired from different relative positions of the image acquisition means to the human subject;

an extraction module configured to use a processor for automatically extracting two dimensional original profiles of the body of the human subject from each two dimensional acquired image;

a generating module configured to use a processor for generating a two-dimensional body surface profile of the body of the human subject for each two dimensional original profile extracted from the acquired images by:

(i) automatically determining a plurality of body boundary mark features on the two dimensional original profile by comparing one or more shape features of a point or region on the original two dimensional profile against corresponding shape features which comprise body boundary mark features on a reference two dimensional profile selected according to a human body parameter from a database of reference body profiles, wherein said human body parameter comprising the area enclosed by the original profile, the height of the human body or the weight of the human body;

(ii) selecting one or more two dimensional body profiles from a library, by calculating the difference between the shape features of the determined plurality of body boundary mark features of the original two dimensional profile and the corresponding shape features of body profiles in said library;

(iii) interpolating the selected body profiles to generate a two dimensional body surface profile of the body of the human subject; and a construction module configured to use a processor for constructing a three-dimensional human body model from each of the interpolated two-dimensional body surface profiles of the human subject.

17. An electronic device for modelling a body of a human subject, comprising:

a processing component;

a memory for storing instructions executable by the processing component; and a multi-media component, wherein the multi-media component is configured to provide an interface for receiving user interaction; and the processing component is configured to:

acquire at least two two-dimensional images of the body of the human subject wherein said images are acquired by an image acquisition means in communication with the processor, wherein said image acquisition means acquires the images at different relative positions to the human subject;

automatically extract two dimensional original profiles of the body of the human subject from each two dimensional acquired image;

generate a two-dimensional body surface profile of the body of the human subject for each two dimensional original profile extracted from the acquired images by:

(i) automatically determining a plurality of body boundary mark features on the two dimensional original profile by comparing one or more shape features of a point or region on the original two dimensional profile against corresponding shape features which comprise body boundary mark features on a reference two dimensional profile selected according to a human body parameter from a database of reference body profiles, wherein said human body parameter comprising the area enclosed by the original profile, the height of the human body or the weight of the human body;

(ii) selecting one or more two dimensional body profiles from a library, by calculating the difference between the shape features of the determined plurality of body boundary mark features of the original two dimensional profile and the corresponding shape features of body profiles in said library:

(iii) interpolating the selected body profiles to generate a two-dimensional body surface profile of the body of the human subject; and construct a three-dimensional human body model from each of the interpolated two-dimensional body surface profiles of the human subject.

18. The electronic device of claim 17 further comprising: a communication component wherein the communication component is configured to: provide a bidirectional communication link between the electronic device and a server; transmit data which is sent by the electronic device to the server; and receive data which is sent by the server to the electronic device.

* * * * *